United States Patent
Kim

(10) Patent No.: US 10,207,631 B2
(45) Date of Patent: Feb. 19, 2019

(54) CONTROL DEVICE MOUNTED ON VEHICLE AND METHOD FOR CONTROLLING THE SAME

(71) Applicant: LG ELECTRONICS INC., Seoul (KR)

(72) Inventor: Ana Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/625,011

(22) Filed: Jun. 16, 2017

(65) Prior Publication Data

US 2017/0361759 A1    Dec. 21, 2017

(30) Foreign Application Priority Data

Jun. 17, 2016    (KR) ..................... 10-2016-0075901

(51) Int. Cl.
| | |
|---|---|
| *B60Q 1/08* | (2006.01) |
| *B60W 40/02* | (2006.01) |
| *B60R 1/00* | (2006.01) |
| *G01C 21/36* | (2006.01) |

(52) U.S. Cl.
CPC ............... *B60Q 1/08* (2013.01); *B60R 1/00* (2013.01); *B60R 2300/105* (2013.01); *B60R 2300/205* (2013.01); *B60R 2300/303* (2013.01); *B60R 2300/806* (2013.01); *G01C 21/3667* (2013.01)

(58) Field of Classification Search
CPC .... B60Q 1/08; B60Q 1/085; G08G 1/096716; G01C 21/3626; B60W 40/02
See application file for complete search history.

(56) References Cited

U.S. PATENT DOCUMENTS

| | | | |
|---|---|---|---|
| 2010/0191465 A1* | 7/2010 | Noll .................... | G01C 21/3626 701/414 |
| 2013/0101174 A1* | 4/2013 | Meis ................. | G08G 1/096716 382/104 |
| 2017/0008445 A1* | 1/2017 | Roeckl .................... | B60Q 1/085 |

FOREIGN PATENT DOCUMENTS

| | | | | |
|---|---|---|---|---|
| JP | 20060327380 | | 12/2006 | |
| JP | 20080143505 | | 6/2008 | |
| KR | 20080109319 | | 12/2008 | |
| KR | 20140029820 | | 3/2014 | |
| KR | 20160000203 | | 1/2016 | |
| KR | 20160000203 A | * | 1/2016 | ............ B60W 40/02 |

* cited by examiner

*Primary Examiner* — Yuri Kan
(74) *Attorney, Agent, or Firm* — Fish & Richardson P.C.

(57) ABSTRACT

A control device is configured to provide route information for a vehicle and includes: a headlamp configured to irradiate light in a forward direction of the vehicle; a sensing unit configured to sense at least one sign located in the forward direction of the vehicle; and at least one processor. The at least one processor is configured to, based on a first portion of the at least one sign corresponding to first route information of the vehicle, control the headlamp to irradiate the light on the first portion of the at least one sign that corresponds to the first route information of the vehicle.

20 Claims, 21 Drawing Sheets

FIG. 7A
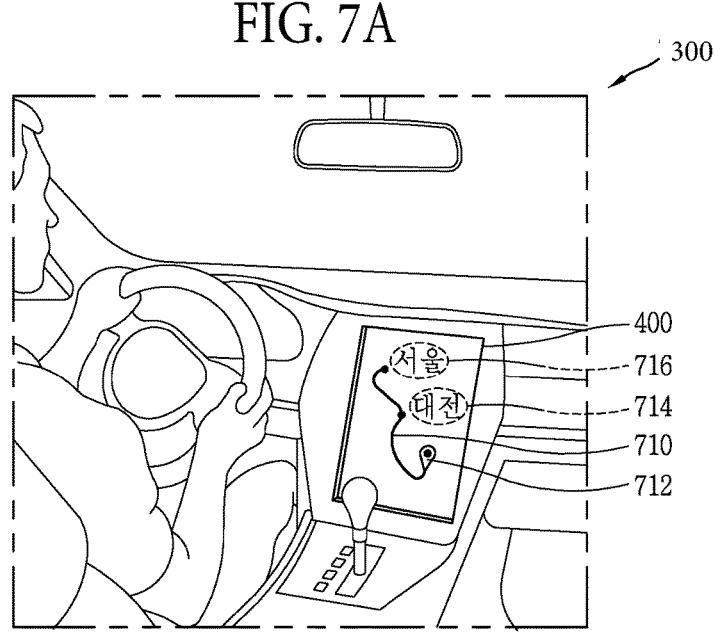
FIG. 7B
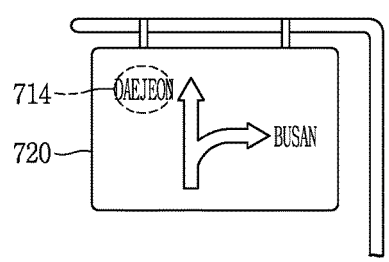
FIG. 7C
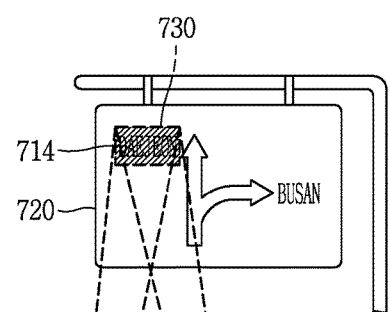
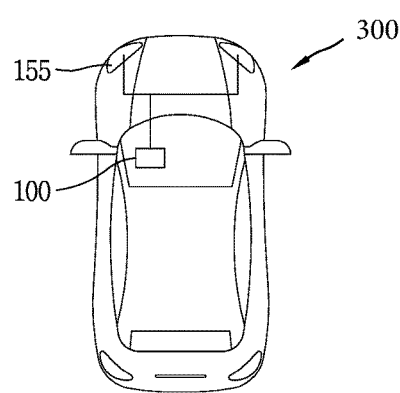
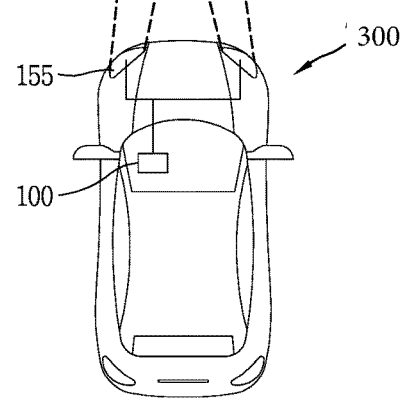

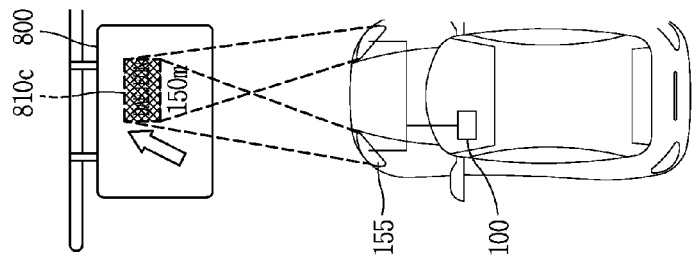
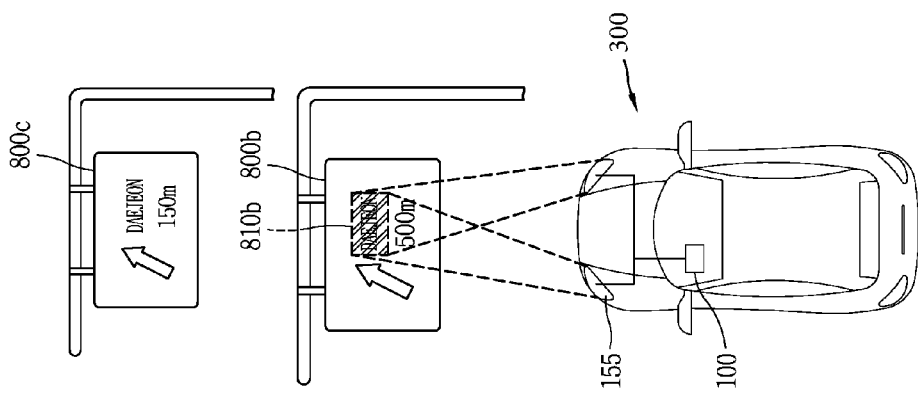
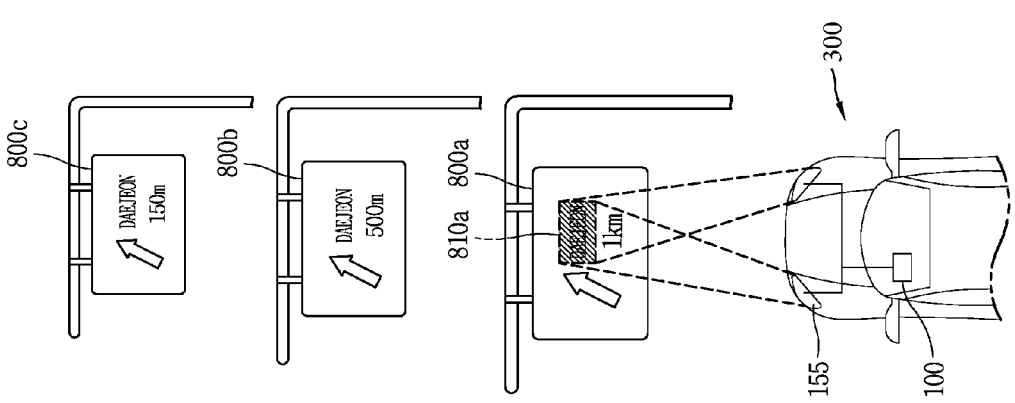

FIG. 14A
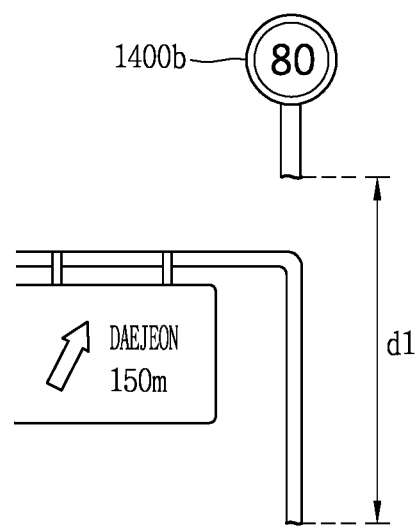
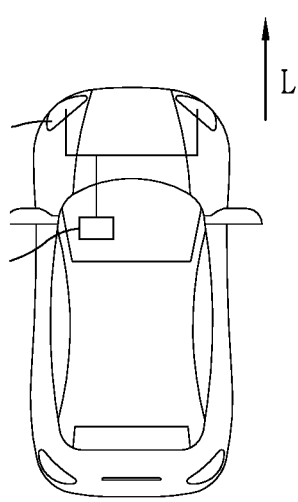
FIG. 14B
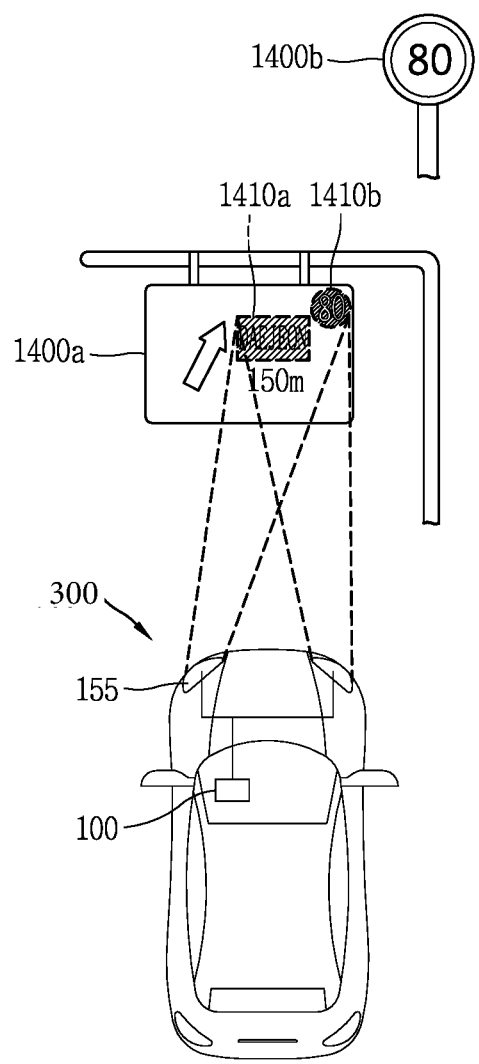

[ROUTE INFORMATION IS NOT SET]

CONTROL DEVICE MOUNTED ON VEHICLE AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2016-0075901, filed on Jun. 17, 2016, the contents of which is incorporated by reference herein in its entirety.

TECHNICAL FIELD

The present disclosure generally relates to a control device mounted on a vehicle and a method for controlling the same.

BACKGROUND

A vehicle is an apparatus configured to transport a user in a desired direction. A common example of a vehicle is an automobile.

Various types of lamps are typically provided in a vehicle. In general, a vehicle includes various automotive lamps that implement different lighting functions, for example an illumination function that facilitates visibility of objects in the vicinity of the vehicle while driving at night, or a signalling function that informs those outside the vehicle of the driving status of the vehicle.

As an example, a vehicle may include a lighting apparatus that is operated in a direct illumination technique using a lamp, such as a headlamp that irradiates a forward direction to facilitate a driver's vision, a brake lamp that illuminates upon operation of a brake of the vehicle, or a turn signal lamp that illuminates when turning left of right.

As another example, a vehicle may include a reflector or the like that is configured to reflect light, and thus facilitate visibility of the vehicle to those outside the vehicle. Such reflectors may be mounted at a front side or a rear side of the vehicle.

Typically, operations of lamps in a vehicle are regulated by installation standards and/or specifications of such automotive lamps.

SUMMARY

Implementations are disclosed herein that provide a control device that is to mounted on a vehicle and that is configured to control one or more lamps provided in the vehicle.

In one aspect, a control device may be configured to provide route information for a vehicle and may include: a headlamp configured to irradiate light in a forward direction of the vehicle; a sensing unit configured to sense at least one sign located in the forward direction of the vehicle; and at least one processor. The at least one processor may be configured to, based on a first portion of the at least one sign corresponding to first route information of the vehicle, control the headlamp to irradiate the light on the first portion of the at least one sign that corresponds to the first route information of the vehicle.

In some implementations, the at least one processor may control the headlamp to irradiate the light in a first illumination manner that illuminates, among a plurality of information detected on the at least one sign, first information detected on the at least one sign that corresponds to the first route information of the vehicle.

In some implementations, the at least one processor may, based on a type of the at least one sign, control the headlamp to irradiate, on the first portion of the at least one sign, the light in a shape that corresponds to the type of the at least one sign.

In some implementations, the at least one processor may, based on the at least one sign including a plurality of signs on which different information is detected, control the headlamp to irradiate the light on a first sign, among the plurality of signs, on which first information corresponding to the first route information of the vehicle is detected.

In some implementations, the at least one processor may, based on a plurality of information associated with the first route information being sensed a plural number of times on the at least one sign through the sensing unit, control the headlamp to irradiate the light in a plurality of illumination manners that illuminate the plurality of information on the at least one sign.

In some implementations, the control device may further include a communication unit. The at least one processor may, based on second route information different from the first route information being received through the communication unit, irradiate the light in a second illumination manner on a second portion of the at least one sign that corresponds to the received second route information.

In some implementations, the at least one processor may be further configured to: based on another vehicle being sensed within a threshold distance of the vehicle through the sensing unit, change an output manner of the light irradiated on the at least one sign.

In some implementations, the at least one processor may be further configured to: based on the sensing unit sensing light being irradiated on the at least one sign from a trailing vehicle, control the headlamp to reduce the light that is irradiated on the at least one sign.

In some implementations, the at least one processor may be further configured to: based on the vehicle travelling from a first road portion to a second road portion, control the headlamp to irradiate light that indicates, on a surface of a road, an illumination pattern that guides changing from the first road portion to the second road portion.

In some implementations, the at least one processor may be further configured to: based on the vehicle being within a threshold distance from a destination indicated in the first route information, control the headlamp of the vehicle to irradiate light on a first type of sign and on a physical space satisfying a first condition.

In some implementations, the at least one processor may be further configured to: based on a first sign and a second sign being sensed through the sensing unit, the second sign separated from the first sign in the forward direction of the vehicle by a threshold distance, control the headlamp to irradiate the light by irradiating, on the first sign, an illumination pattern that includes information detected in the second sign.

In some implementations, the at least one processor may be further configured to: based on the sensing unit sensing a first sign that indicates a speed limit, and based on a speed of the vehicle exceeding the speed limit, control the headlamp to irradiate light on the first sign that indicates the speed limit. In some implementations, the at least one processor may, based on the vehicle being in a manual driving mode, control the headlamp to selectively irradiate the light on a first type of sign; and based on the vehicle being in an autonomous driving mode, control the headlamp to selectively irradiate the light on a second type of sign.

In some implementations, the control device may further include a camera. The at least one processor may be further configured to control the camera to capture an image of a first sign on which the light from the headlamp is irradiated; and display, on a display unit provided in the vehicle, information associated with the captured image of the first sign on which the light from the headlamp is irradiated.

In some implementations, the at least one processor may be further configured to: based on the headlamp ceasing to irradiate the light on the first sign as the vehicle passes the sensed sign or as another vehicle irradiates light on the first sign, display, on the display unit provided in the vehicle, the information associated with the captured image of the first sign.

In some implementations, the at least one processor may be further configured to: based on route information not being set for a current driving operation of the vehicle, control the headlamp to irradiate the light on a first sign based on information other than route information.

In another aspect, a vehicle may include the control device according to one or more implementations described above.

In yet another aspect, a method of controlling a vehicle that includes a control device configured to provide route information is disclosed. The method may include: sensing at least one sign located in a forward direction of the vehicle; and, based on a first portion of the at least one sign corresponding to first route information of the vehicle, controlling a headlamp of the vehicle to irradiate light on the first portion of the at least one sign that corresponds to the first route information of the vehicle.

In some implementations, controlling the headlamp of the vehicle may further include controlling the headlamp to irradiate the light in a first illumination manner that illuminates, among a plurality of information detected on the at least one sign, first information detected on the at least one sign that corresponds to the first route information of the vehicle.

In some implementations, controlling the headlamp of the vehicle may include, based on a type of the at least one sign, controlling the headlamp to irradiate, on the first portion of the at least one sign, the light in a shape that corresponds to the type of the at least one sign.

Further scope of applicability of the present disclosure will become more apparent from the detailed description given hereinafter. However, it should be understood that the detailed description and specific examples are given by way of illustration only, and that various changes and modifications within the spirit and scope of the disclosure may be made.

BRIEF DESCRIPTION OF THE DRAWINGS

FIGS. 7A to 7F are diagrams illustrating examples of the control illustrated in FIG. 6; and FIGS. 8A to 8C, 9A, 9B, 10A, 10B, 11A, 11B, 12, 13, 14A, 14B, 15, 16A, 16B, 17, 18, 19A, and 19B are diagrams illustrating various examples of controlling a headlamp according to various implementations of the present disclosure.

DETAILED DESCRIPTION

Implementations are disclosed herein that provide a control device that is mounted on a vehicle and that is configured to control one or more lamps provided in the vehicle. As an example, the control device may be configured to control a headlamp in an improved manner based on route information of the vehicle.

In some scenarios, the control device may be configured as part of an advanced driving assist system (ADAS) of a vehicle, which may be configured to improve user convenience and safety. In general, the control device may be configured to control one or more lamps of a vehicle and may improve convenience of driving of the vehicle.

In some implementations, the control device may control a headlamp of the vehicle to selectively irradiate light on a landmark or feature outside the vehicle, based on various types of information. For example, the control device may control the headlamp to selectively illuminate parts of signs or parts of a road that is relevant to navigation information of the vehicle.

As an example, if a sign along a road in front the vehicle displays information that corresponds to a particular route information for the vehicle, then the control device may detect such information and control the headlamp to selectively irradiate light on a portion of the sign to illuminate the relevant information on the sign. As such, implementations described herein may provide a type of user interface that allows a driver to perform a driving operation in a more convenient and intuitive manner.

As another example, if a plurality of signs are sensed, then the control device may selectively illuminate a portion of one or more of the signs that is relevant to route information of the vehicle. As such, the control device may provide a type of user interface that assists a driver to view relevant signs or other landmarks associated with the traveling of the vehicle in an easier and more intuitive manner.

A vehicle according to implementations described herein may be any suitable vehicle, such as an automobile, a motorcycle, and the like. Hereinafter, examples will be described based on an automobile.

A vehicle according to implementations described herein may be powered by any suitable power source, and may be implemented as, for example, an internal combustion engine vehicle having an engine as a power source, a hybrid vehicle having an engine and an electric motor as a power source, an electric vehicle having an electric motor as a power source, and the like.

In some implementations, the vehicle may be an autonomous driving vehicle that autonomously performs one or more driving operations.

In the description below, the left of the vehicle denotes the left side in a traveling direction of the vehicle, and the right of the vehicle denotes the right side in a traveling direction of the vehicle. A front side of the vehicle refers to a forward driving direction of the vehicle, and a rear side refers to a backward driving direction of the vehicle.

Figure 1:
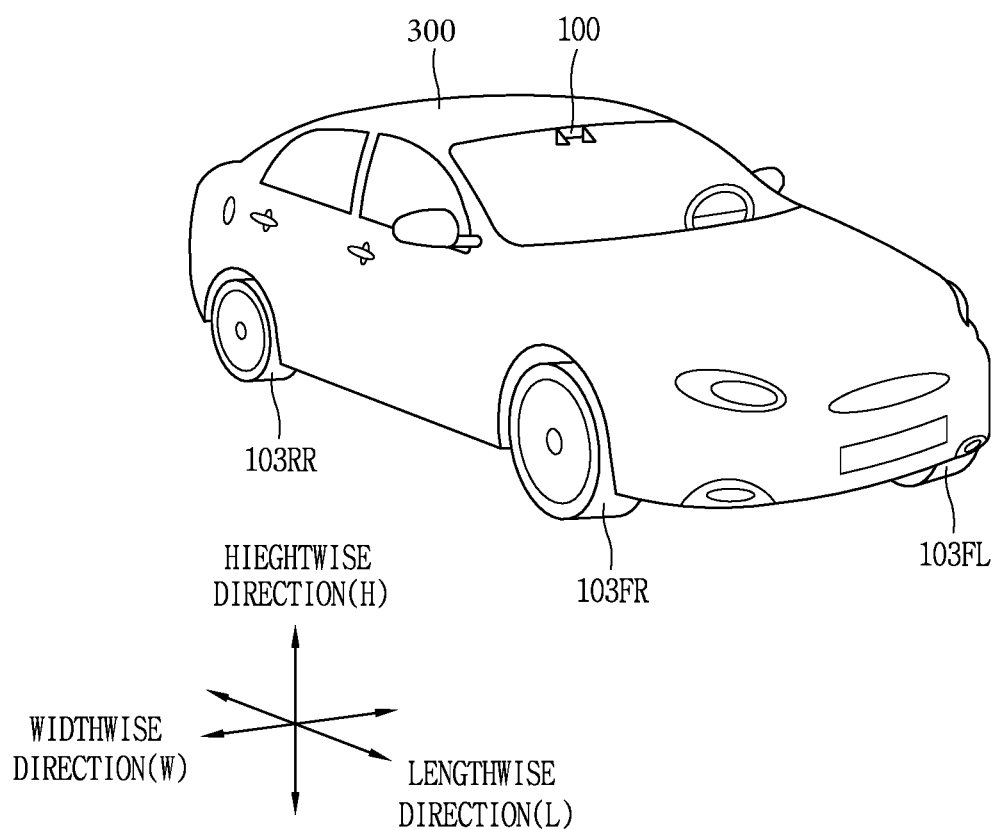
FIG. 1 is a diagram illustrating an example of an outer appearance of a vehicle according to an implementation of the present disclosure.

FIG. 1 is a view illustrating an outer appearance of a vehicle according to an implementation of the present disclosure.

Referring to FIG. 1, a vehicle 300 may include wheels 103FR, 103FL, 103RL, . . . rotated by a power source, a steering apparatus for controlling the traveling direction of the vehicle 300, and the like.

The steering apparatus may include, for example, a steering wheel. A user may control the traveling direction of the vehicle 300 through operation of the steering wheel.

A steering input received through the steering apparatus may be transferred to a steering wheel.

The steering apparatus may be electrically or mechanically connected to the steering wheel.

The steering wheels may be preferably front wheels 103FL, 103FR, but all the front wheels 103FL, 103FR and rear wheels 103RR, . . . ) may be operated as steering wheels.

FIGS. 2A through 3C are diagrams illustrating examples of a camera module included in a control device according to an implementation of the present disclosure.

Figure 2A:
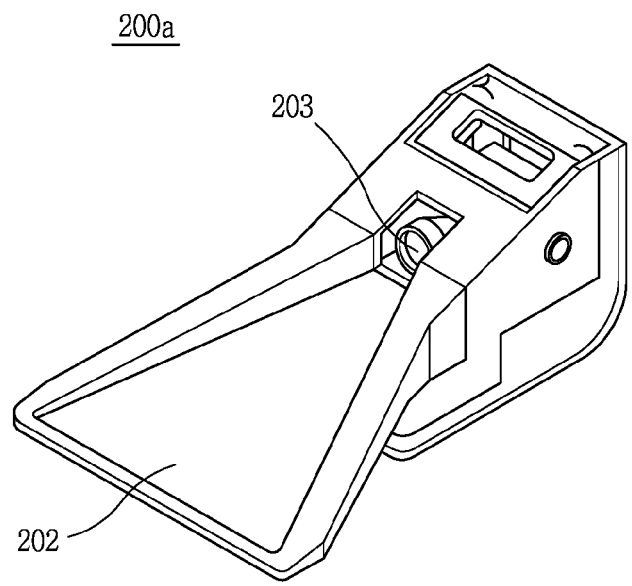
FIGS. 2A through 2C are diagrams illustrating various examples of a camera module included in a control device according to an implementation of the present disclosure.

Referring to FIG. 2A, a camera unit 200a may include an image sensor (for example, CCD or CMOS), a lens 203, and a light shield 202 for shielding part of light incident to the lens 203.

The camera unit 200a may have a structure configured to be detachable from or attachable to an indoor ceiling or wind shield.

The camera unit 200a may acquire an image in the vicinity of the vehicle. For example, the camera unit 200a may acquire an image in front or rear of the vehicle. The image acquired through the camera unit 200a may be transmitted to a least one processor, e.g., an image processing processor.

On the other hand, an image acquired from a mono camera unit 200a may be referred to as a mono image. Furthermore, the camera unit 200a described with reference to FIG. 2A may be referred to as a mono camera unit or single camera unit.

Figure 2B:
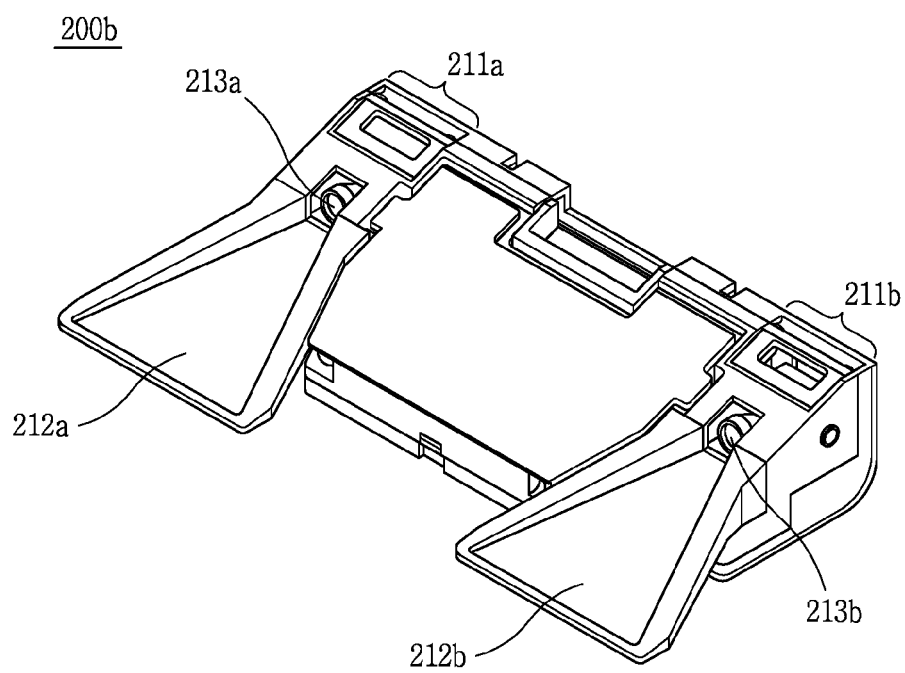

Referring to FIG. 2B, a camera unit 200b may include a first camera 211a and a second camera 211b. The first camera 211a may include a first image sensor (for example, CCD or CMOS) and a first lens 213a. The second camera 211b may include a second image sensor (for example, CCD or CMOS) and a second lens 213b.

On the other hand, the camera unit 200b may include a first light shield 212a and a second light shield 212b for shielding part of light incident to the first lens 213a and second lens 213b.

The camera unit 200b may be detachable from or attachable to an indoor shield or wind shield. For example, The camera unit 200b may acquire an image in the vicinity of the vehicle. For example, the camera unit 200b may acquire an image in front or rear of the vehicle. The image acquired through the camera unit 200b may be transmitted to at least one processor, e.g., an image processing processor.

On the other hand, an image acquired from the first camera 211a and second camera 211b may be referred to as a stereo image.

On the other hand, the camera unit 200b described with reference to FIG. 2B may be referred to as a stereo camera unit.

Figure 2C:
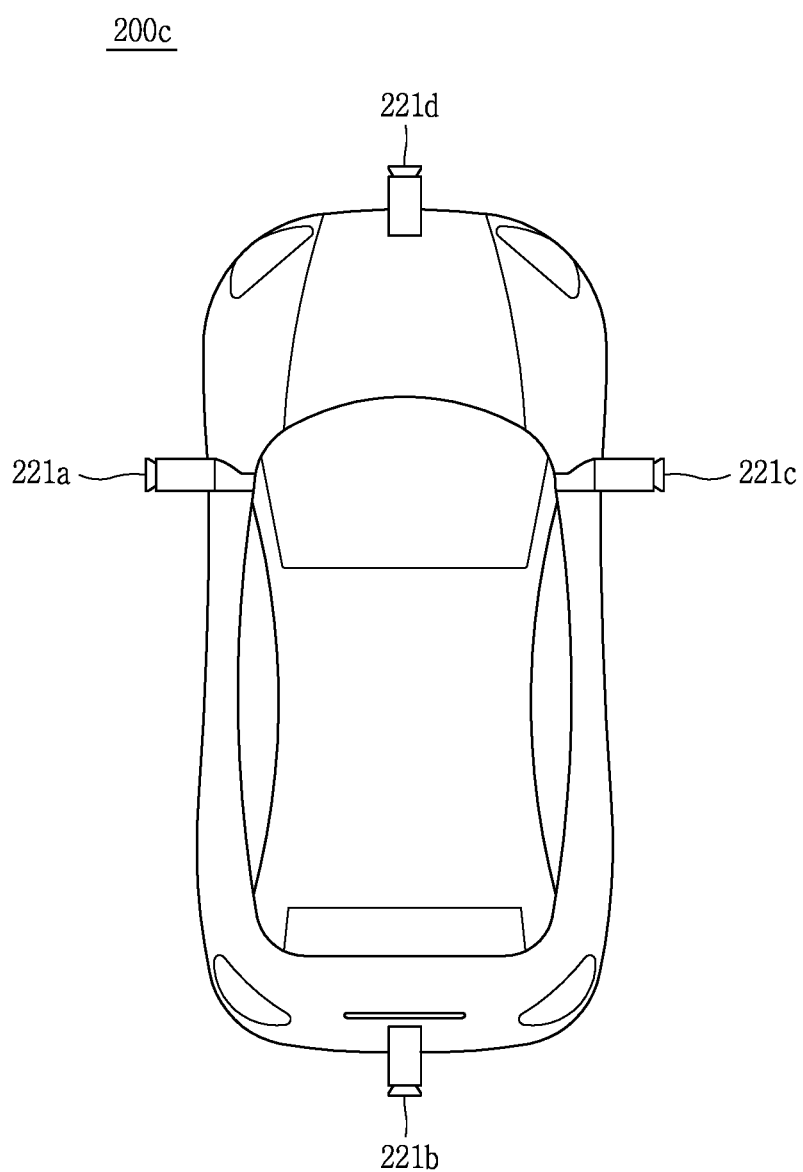

Referring to FIG. 2C, a camera unit 200c may include a plurality of cameras 221a, 221b, 221c, 221d.

For example, a left camera 221a may be disposed within a case surrounding a left side mirror. A right camera 221c may be disposed within a case surrounding a right side mirror. A front camera 221d may be disposed in one region of a front bumper. A rear camera 221b may be disposed in one region of a trunk lid.

The plurality of cameras 221a, 221b, 221c, 221d may be disposed at a left side, a rear side, a right side and a front side of the vehicle, respectively. The plurality of cameras 221a, 221b, 221c, 221d may respectively include an image sensor (for example, CCD or CMOS) and a lens.

The camera unit 200c may acquire an image adjacent to the vehicle. For example, the camera unit 200c may acquire images at a front side, a rear side, a left side and a right side of the vehicle. An image acquired through the camera unit 200c may be transmitted to at least one processor, e.g., an image processing processor.

On the other hand, images acquired from the plurality of cameras 221a, 221b, 221c, 221d in FIG. 2C or a composite image of the acquired images may be referred to as an around view image. Furthermore, the camera unit 200c described with reference to FIG. 2C may be referred to as an around view camera unit.

Figure 3:
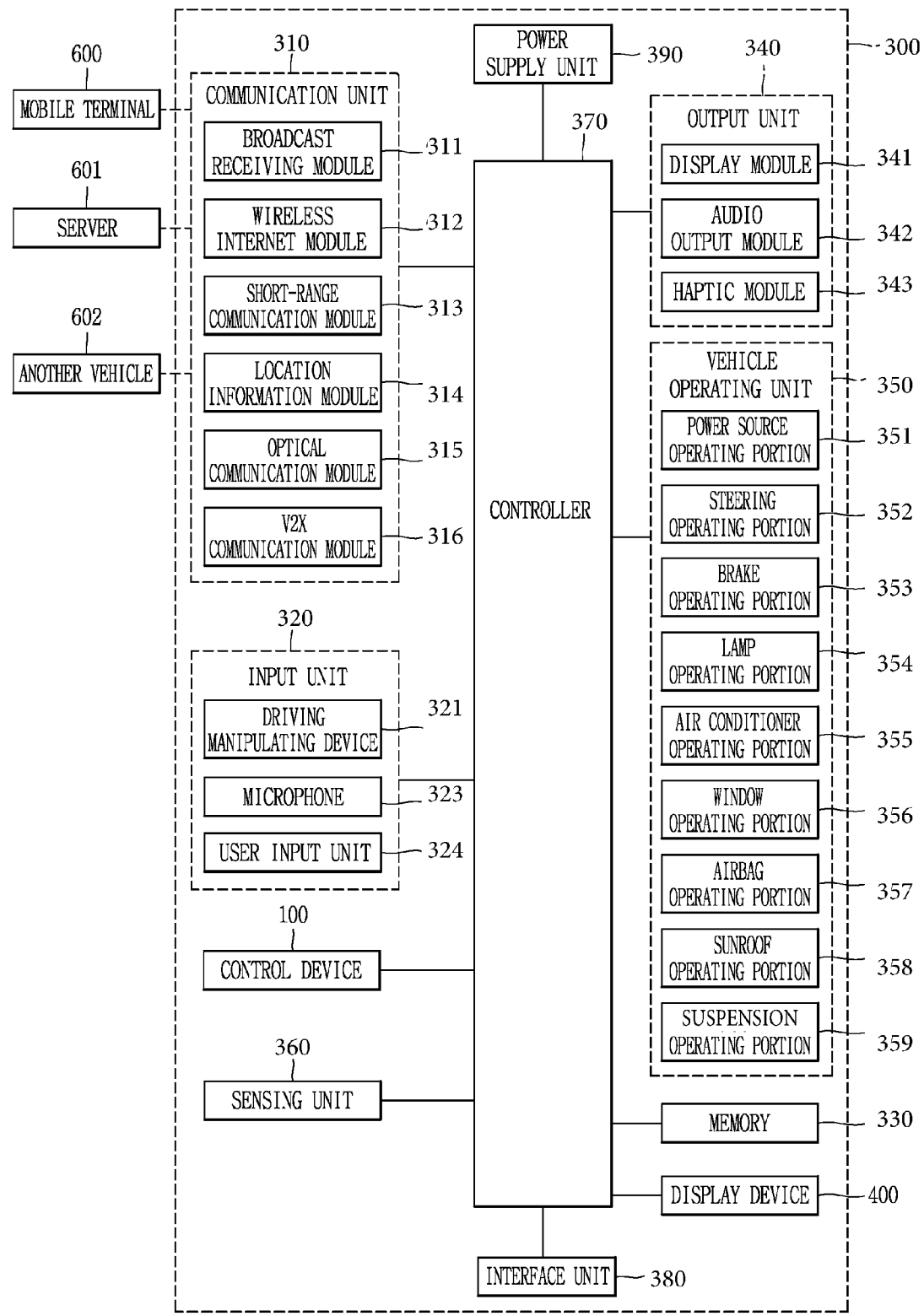
FIG. 3 is a block diagram illustrating an example of a vehicle according to an implementation of the present disclosure.

FIG. 3 is a block diagram referred to explain a vehicle 300 according to an implementation of the present disclosure.

Referring to FIG. 3, the vehicle 300 may include a communication unit 310, an input unit 320, a sensing unit 360, an output unit 340, a vehicle drive unit 350, a memory 330, an interface unit 380, a controller 370, a power unit 390, a control device 100, a driver status monitoring (DSM) system and a display device 400 for a vehicle.

The communication unit 310 may include one or more modules configured to allow wireless communication between the vehicle 300 and a mobile terminal 600, the vehicle 300 and an external server 601 or the vehicle 300 and another vehicle 602. Furthermore, the communication unit 310 may include one or more modules for connecting the vehicle 300 to one or more networks.

The communication unit 310 may include a broadcast receiving module 311, a wireless internet module 312, a short-range communication module 313, a location information module 314, an optical communication module 315, and a V2X communication module 316.

The communication unit 310 may receive weather information. The communication unit 310 may receive weather information from an outside through the broadcast receiving module 311, wireless internet module 312 or V2X communication module 316.

The communication unit 310 may receive traveling road information. The communication unit 310 may determine the location of the vehicle 300 through the location information module 314, and receive road information corresponding to the location of the vehicle 300 through the wireless internet module 312 or V2X communication module 316.

The communication unit 310 may receive traffic signal change information from the external server 601 through the V2X communication module 316. Here, the external server 601 may be a server located at a traffic control center for controlling to traffic.

The broadcast receiving module 311 receives a broadcast signal or broadcast associated information from an external broadcast management server through a broadcast channel. Here, broadcast may include radio broadcast or TV broadcast.

The wireless internet module 312 refers to a module for wireless internet access, and may be integrally or separably mounted on the vehicle 300. The wireless internet module 312 is configured to transmit or receive wireless signals from communication networks according to the wireless internet technologies.

The wireless internet technologies may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like, and the wireless internet module 312 may transmit or receive data according to at least one wireless internet technology in a range including even internet technologies which are not listed in the above. For example, the wireless internet module 312 may exchange data in a wireless manner with the external server 601. The wireless internet module 312 may receive weather information, traffic condition information (for example, transport protocol expert group (TPEG) information) on roads.

The short-range communication module 313 is provided for short-range communication, and may support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) technologies.

The short-range communication module 313 may form wireless area networks to perform short-range communication between the vehicle 300 and at least one external device. For example, the short-range communication module 313 may exchange data in a wireless manner with the mobile terminal 600. The short-range communication module 313 may receive weather information, traffic condition information (for example, transport protocol expert group (TPEG) information) on roads from the mobile terminal 600. For example, when a user is aboard the vehicle 300, the user's mobile terminal 600 and vehicle 300 may automatically perform pairing with each other or by the execution of the user's application.

The location information module 314, a module for acquiring the location of the vehicle 300, may include a global positioning system (GPS) as a representative example. For example, the vehicle may acquire the location of the vehicle using a signal sent from a GPS satellite when the GPS module is used.

The optical communication module 315 may include a light transmitter and light receiver.

The light receiver may convert a light signal into an electrical signal to receive information. The light receiver may include a photo diode (PD) for receiving light. The photo diode may convert light into an electrical signal. For example, the light receive may receive the information of a preceding vehicle through light emitted from a light source included in the preceding vehicle.

The light transmitter may include at least one of light emitting elements for converting an electrical signal into a light signal. Here, light emitting element may be preferably a light emitting diode (LED). The light transmitter converts an electrical signal into a light signal to transmit it to an outside. For example, the light transmitter may emit a light signal to an outside through the on/off of a light emitting element corresponding to a predetermined frequency.

According to an implementation, the light transmitter may include a plurality of light emitting element arrays. According to an implementation, the light transmitter may be integrated into a lamp provided in the vehicle 300.

For example, the light transmitter may be any one of headlights, tail lights, brake lights, turn signals and sidelights. For example, the optical communication module 315 may exchange data with another vehicle 602 through optical communication.

The V2X communication module 316 is a module for performing wireless communication with the external server 601 or another vehicle 602. The V2X communication module 316 may include a module configured to implement a communication (V2V) protocol between vehicles or communication (V2I) protocol between the vehicle and the infrastructures. The vehicle 300 may perform wireless communication with the external server 601 and another vehicle 602 through the V2X communication module 316.

The input unit 320 may include a camera, a camera unit 200a, 200b, 200c, a microphone 323, and a user input unit 324.

The microphone 323 may process an external audio signal into electrical data. The processed data may used in various ways according to a function being carried out in the vehicle 300. The microphone 323 may convert a user's voice command into electrical data.

The converted electrical data may be transferred to the controller 370.

In some implementations, the camera or microphone or other input device may be a constituent element included in the sensing unit 360 other than an constituent element included in the input unit 320.

The user input unit 324 is provided to receive information from a user. When information is received through the user input unit 324, the controller 370 may control the operation of the vehicle 300 corresponding to the received information. The user input unit 324 may include a touch type input device or mechanical type input device. According to an implementation, the user input unit 324 may be disposed in one region of a steering wheel. In this case, a driver may manipulate the user input unit 324 with his or her finger while holding the steering wheel.

The user input unit 324 may receive, for example, a turn signal input or other input signal related to an operation of the vehicle.

The user input unit 324 may also include a driving manipulation device 321, such as a steering wheel or other input device that controls the vehicle.

The sensing unit 360 senses a signal associated with the traveling of the vehicle 300 or the like. To this end, the sensing unit 360 may include a collision sensor, a wheel sensor, a speed sensor, a tilt sensor, a weight sensor, a heading sensor, a yaw sensor, an acceleration sensor, a gyro sensor, a position module, a vehicle forward/reverse sensor, a battery sensor, a fuel sensor, a tire sensor, a steering sensor due to handle rotation, a vehicle interior temperature sensor, a vehicle interior humidity sensor, a rain sensor, a luminance sensor, a tire pressure sensor, an ultrasonic sensor, a light detection and ranging (LiDAR), and the like.

As a result, the sensing unit 360 may acquire sensing signals on vehicle collision information, vehicle direction information, vehicle location information (GPS information) vehicle angle information, vehicle traveling speed information, vehicle acceleration information, vehicle tilt information, vehicle forward/reverse information, battery information, fuel information, tire information, vehicle lamp information, vehicle interior temperature information, vehicle interior humidity information, information on whether it rains or not, a steering wheel rotation angle, ambient luminance information, tire pressure information, and the like.

On the other hand, the sensing unit 360 may further include a gas pedal sensor, a pressure sensor, an engine speed sensor, an air flow sensor (AFS), an air temperature sensor (ATS), a water temperature sensor (WTS), a TDC sensor, a crank angle sensor, and the like.

On the other hand, the ultrasonic sensor, radar or LIDAR may detect and track an object. The ultrasonic sensor, radar or LIDAR may calculate a distance and a relative speed to the detected object.

The ultrasonic sensor, radar or LIDAR may sense a dangerous situation. A process included in the ultrasonic sensor, radar or LIDAR may sense a dangerous situation based on a distance to the object.

The sensing unit 360 may include a posture sensor. The posture sensor may sense the posture of the vehicle. The posture sensor may generate the posture information of the vehicle.

The posture sensor may include the foregoing yaw sensor, acceleration sensor, gyro sensor, and body tilt sensor.

The sensing unit 360 may include a wind sensor. The wind sensor may sense a wind direction and a wind speed. The wind sensor may generate wind direction information and wind speed information. The wind sensor may include a ultrasonic type wind sensor. The wind sensor may measure the speed and direction of wind using the property of increasing or decreasing the speed of transferring ultrasonic waves being transferred through an air medium.

The sensing unit 360 may include a biometric information sensing unit. The biometric information sensing unit senses and acquires the biometric information of a passenger. The biometric information may include fingerprint information, iris-scan information, retina-scan information, hand geometry information, facial recognition information, voice recognition information, and the like. The biometric information sensing unit may include a sensor for sensing the biometric information of a passenger. Here, the internal camera and microphone 323 may be operated as a sensor. The biometric information sensing unit may acquired hand geometry information, facial recognition information and the like through the internal camera.

The output unit 340 is provided to output information processed in the controller 370, and may include a display unit 341, an audio output unit 342 and a haptic output unit 343.

The display unit 341 may display information processed in the controller 370. For example, the display unit 341 may display vehicle associated information. Here, vehicle associated information may include vehicle control information for directly controlling a vehicle or vehicle driving assistance information for providing driving guide to a vehicle driver. Furthermore, the vehicle associated information may include vehicle status information for notifying the current status of the vehicle or vehicle travel information associated with the traveling of the vehicle.

The display unit 341 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 341 may form an interlayer structure with or may be integrally formed with a touch sensor to implement a touch screen. The touch screen may provide an output interface between the vehicle 300 and a user while at the same time functioning as the user input unit 324 for providing an input interface between the vehicle 300 and the user. In this case, the display unit 341 may include a touch sensor for sensing a touch to the display unit 341 to receive a control command. Using this, when a touch to the display unit 341 is carried out, the touch sensor may sense the touch, and the controller 370 may generate a control command corresponding to the touch based on this. Input data due to a touch method may be a text or number, an instruction or specifiable menu item in various modes, and the like.

On the other hand, the display unit 341 may include a cluster to check vehicle status information or vehicle travel information while a driver drives a vehicle. The cluster may be located on a dash board. In this case, the driver may check information displayed on the cluster while maintaining his or her line of sight in a forward direction of the vehicle.

On the other hand, according to an implementation, the display unit 741 may be implemented as a head-up display (HUD). When the display unit 341 is implemented as a HUD, information may be displayed through a transparent displayed provided on a wind shield. Alternatively, the display unit 341 may be provided with a projection module to display information through an image projected on the wind shield.

The audio output unit 342 converts and outputs an electrical signal supplied from the controller 370 into an audio signal. To this end, the audio output unit 342 may include a speaker or the like. The audio output unit 342 is also able to output a sound corresponding to the operation of the user input unit 324.

The haptic output unit 343 generates a tactile output. For example, the haptic output unit 343 may be operated to vibrate a steering wheel, a safety belt, a seat to allow the user to recognize the output.

The vehicle drive unit 350 may control the operation of various devices in a vehicle. The vehicle drive unit 350 may receive a control signal from a steering apparatus or control device 100. The vehicle drive unit 350 may control each device based on the control signal.

The vehicle drive unit 350 may include a power source drive unit 351, a steering drive unit 352, a brake drive unit 353, a lamp drive unit 354, an air conditioning drive unit 355, a window drive unit 356, an airbag drive unit 357, a sunroof drive unit 358, and a suspension drive unit 359.

The power source drive unit 351 may perform electronic control for a power source within the vehicle 300.

For example, a fossil fuel based engine is a power source, the power source drive unit 351 may perform electronic control for an engine. Due to this, it may be possible to control an output torque of the engine. When the power source drive unit 351 is an engine, an engine torque output may be limited by the control of the controller 370 to limit the speed of the vehicle.

For another example, when an electricity base motor is a power source, the power source drive unit 351 may perform control for the motor. Due to this, it may be possible to control a rotation speed, a torque or the like of the motor.

The power source drive unit 351 may receive an acceleration control signal from the steering apparatus or control device 100. The power source drive unit 351 may a power source according to the received acceleration control signal.

The steering drive unit 352 may perform electronic control for a steering apparatus within the vehicle 300. Due to this, it may be possible to change the traveling direction of a vehicle.

The steering drive unit 352 may receive a steering control signal from the steering apparatus or control device 100.

The steering drive unit 352 may control the steering apparatus according to the received steering control signal.

The brake drive unit 353 may perform electronic control for a brake apparatus 153 within the vehicle 300. For example, the brake drive unit 353 may control the operation of a brake (or brake apparatus) disposed on a wheel to reduce the speed of the vehicle 300 or disallow the vehicle to move. For another example, the operations of brakes (brake apparatuses) disposed on a left wheel and a right wheel may be different to adjust the traveling direction of the vehicle 300 to the left or the right. The brake drive unit 353 may receive a deceleration control signal from the steering apparatus. The brake drive unit 353 may control a brake apparatus according to the received deceleration control signal.

The lamp drive unit 354 may control the turn-on/turn-off of a lamp disposed at an inside and an outside of the vehicle. Furthermore, the lamp drive unit 354 may control the light intensity, direction or the like of the lamp. For example, the lamp drive unit 354 may perform control for headlamps (low-beam, high-beam), turn indicator lamps, brake lamps, and the like.

The air conditioning drive unit 355 may perform electronic control for an air conditioner within the vehicle 300. For example, where the temperature within the vehicle is high, the air conditioner is operated to control cold air to an inside of the vehicle.

The window drive unit 356 may perform electronic control for a window apparatus within the vehicle 300. For example, the window drive unit 356 may control the opening or closing of left and right windows on a lateral surface of the vehicle.

The airbag drive unit 357 may perform electronic control for an airbag apparatus within the vehicle 300. For example, in a dangerous condition, the airbag drive unit 357 may control an airbag to be inflated.

The sunroof drive unit 358 may perform electronic control for a sunroof apparatus within the vehicle 300. For example, the sunroof drive unit 358 may control the opening or closing of a sunroof.

The suspension drive unit 359 may perform electronic control for a suspension apparatus within the vehicle 300. For example, when a road surface is curved, the suspension apparatus may be controlled to reduce the vibration of the vehicle 300. The suspension drive unit 359 may receive a suspension control signal from the steering apparatus or control device 100. The suspension drive unit 359 may control the suspension apparatus according to the received suspension control signal.

The memory 330 is electrically connected to the controller 370. The memory 330 may store basic data for a unit, control data, input/output data for the operation control of a unit, and the like. The memory 330 may store various data for the entire operation of the vehicle 300 such as a program for processing or controlling the controller 370 or the like.

The memory 330 may include a flash memory, a hard disk, a solid state disk (SDD), a silicon disk drive (SDD), a multimedia card micro type, a card memory (for example, an SD, a XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The vehicle 300 may be operated in association with a web storage apparatus that, like the memory 330, performs a storage function over the Internet.

The memory 330 may be integrally formed with the controller 370.

The interface unit 380 may perform the role of a path to various types of external devices connected to the vehicle 300. For example, the interface unit 380 may include a port that is connectable to the mobile terminal 600, and connected to the mobile terminal 600 through the port. In this case, the interface unit 380 may exchange data with the mobile terminal 600.

On the other hand, the interface unit 380 may perform the role of a path of supplying electrical energy to the mobile terminal 600 connected thereto. When the mobile terminal 600 is electrically connected to the interface unit 380, the interface unit 380 provides electrical energy supplied from the power unit 390 to the mobile terminal 600 according to the control of the controller 370.

The interface unit 380 performs the role of a path to various types of external devices connected to the vehicle 300. The interface unit 380 may include wired or wireless headset ports, external power supply ports, wired or wireless data ports, memory card ports, ports for connecting a device having an identification module, audio input/output (I/O) ports, video I/O ports, earphone ports, or the like. The vehicle 300 may execute an appropriate control associated with a connected external device, in response to the external device being connected to the interface unit 380.

The controller 370 may control the entire operation of each unit, apparatus or each constituent element within the vehicle 300.

The controller 370 may be referred to as an electronic control unit (ECU). In the aspect of hardware, the controller 370 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform other functions.

The power unit 390 may supply power required for the operation of each constituent element according to the control of the controller 370. In particular, the power unit 390 may receive power from a battery within the vehicle.

The steering apparatus or control device 100 may exchange data with the controller 370. Various information, data or control signals generated from the control device 100 may be outputted to the controller 370.

The driver status monitoring (DSM) system is a system of monitoring the status of a driver, and controlling the vehicle 300 according to the status of the driver. The DSM system 260 may include an input device such as an internal camera, a microphone or the like.

The DSM system may sense the status of the driver whether the driver stares forward, whether he or she is drowsy, whether he or she takes food, whether he or she manipulates a device, and the like. Furthermore, the DSM system may sense the driving concentration of the driver while driving.

The DSM system may include a photoplethysmography sensor (PPG). The PPG sensor may be disposed in one region of a steering wheel that can be in contact with a user (for example, driver) body. The PPG sensor may be disposed in one region of a steering wheel rim. The DSM system may acquire and analyze a driver's biological signals through the PPG sensor.

For example, the DSM system may acquire biological signals to generate a driver's body state information as the status information of the driver.

For example, the DSM system may acquire biological signals to generate a driver's excited state information as the status information of the driver.

For example, the DSM system may analyzes a driver image acquired from an internal camera to generate a driver's drowsy state information as the status information of the driver.

For example, the DSM system may analyzes a driver image acquired from an internal camera to generate a driver's device manipulation state information.

The DSM system may provide the status information of the driver to the steering apparatus or control device 100.

The display device 400 for a vehicle may exchange data with the controller 370. The controller 370 may receive navigation information from the display device 400 for a vehicle or an additional navigation apparatus. Here, the navigation information may include set destination information, route information according to the destination, map information associated with the traveling of the vehicle or to vehicle location information.

On the other hand, the vehicle 300 according to an implementation disclosed in the present disclosure may include the control device 100. The control device 100 may control various lamps provided in the vehicle 300.

The various lamps may include a headlamp formed to irradiate visible light in a forward direction of the vehicle, a rear lamp formed to irradiate visible light in a backward direction of the vehicle, a turn indicator lamp, and the like.

The headlamp may be formed in combination of a headlight, a lamp configured to irradiate at least one of low-beam and high-beam based on a user's request and one or more turn indicator lamps.

The control device 100 associated with the present disclosure may be an independent apparatus (or component, constituent element) for controlling at least one constituent element (for example, headlamp 155, sensing unit 360, or the like) provided in the vehicle 300.

Furthermore, the control device 100 may control various units, constituent elements, apparatuses illustrated in FIG. 3 as a whole. For example, the control device 100 may be the controller 370 of the vehicle. In this case, hereinafter, operations, functions, controls or the like that can be carried out by the control device 100 (or processor 170) described in relation to the control device 100 may be performed by the controller 370 of the vehicle 300.

Furthermore, the control device 100 may be referred to as a lamp control device, a vehicle control device, a vehicle assistance device or the like, from the perspective of controlling the lamps provided on the vehicle.

Meanwhile, for the sake of explanation in this specification, description will be given under assumption that the control device 100 is a single independent device (structure or component).

Hereinafter, the control device 100 according to the present disclosure will be described in more detail, with reference to FIG. 4. The following description will be applied to a case where the control device 100 provided in the vehicle is configured as the independent device.

Figure 4:
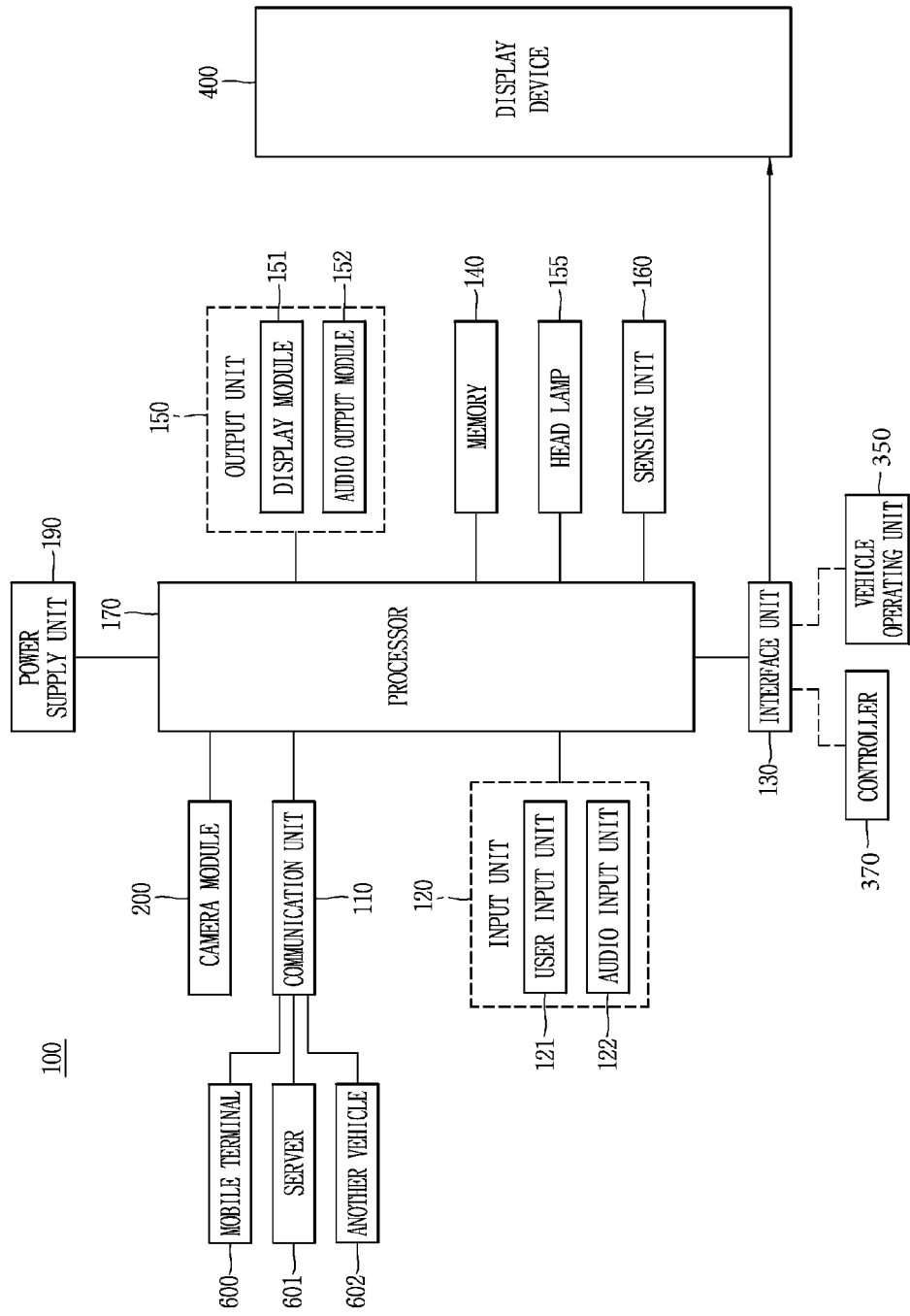
FIG. 4 is a block diagram illustrating an example of a control device according to an implementation of the present disclosure.

FIG. 4 is a block diagram referred to explain a control device according to an implementation of the present disclosure.

Referring to FIG. 4, the control device 100 according to the present disclosure may include a camera module 200, a communication unit 110, an input unit 120, an interface unit 130, a memory 140, an output unit 150, a headlamp 155, a sensing unit 160, a processor 170 and a power unit 190.

The camera module 200 (or camera) may acquire surrounding images of the vehicle.

Data, signals or information generated in the camera module 200 are transmitted to the processor 170.

The camera module 200 may be the camera unit 200a, 200b, 200c described with reference to FIGS. 2A to 2C.

For example, the camera module 200 may be the mono camera unit 200a.

The mono camera unit 200a may acquire a mono image as the surrounding image of the vehicle.

For example, the camera module 200 may be the stereo camera unit 200b. The stereo camera unit 200b may acquire a stereo image as the surrounding image of the vehicle.

For example, the camera module 200 may be an around view camera unit 200c.

The around view camera unit 200c may acquire an around view image as the surrounding image of the vehicle.

The communication unit 110 may exchange data with the mobile terminal 600, the server 601 or the another vehicle 602 in a wireless manner. Specifically, the communication unit 110 may exchange data with the mobile terminal of the driver of the vehicle in a wireless (or wired) manner. Examples of such wireless communication method may include various communication methods, such as Bluetooth, WiFi direct, WiFi, APiX, NFC, etc.

The communication unit 110 may receive weather information, road traffic condition information, for example, TPEG information from the mobile terminal 600 or the server 601. Meanwhile, the control device 100 may also transmit recognized real-time information to the mobile terminal 600 or the server 601.

Meanwhile, when the user gets in the vehicle, the user's mobile terminal 600 and the control device 100 may perform pairing with each other automatically or by the user's execution of an application. In view of this, in some scenarios, the control device 100 may be referred to as a vehicle assistance device.

The communication unit 110 may receive traffic light change information from the external server 601.

Here, the external server 601 may be a server located in a traffic control station for controlling traffic.

The communication unit 110 may receive weather information from the external server 601. Here, the external server 601 may be a server of an organization or an operator providing the weather information. For example, the communication unit 110 may receive, for each region, fine dust information, smog information or yellow dust information from the external server 601.

The input unit 120 may include a user input unit 121 and an audio input unit 122.

The user input unit 121 may include a plurality of buttons or a touch screen. The user input unit 121 may turn on the control device 100 through the plurality of buttons or the touch screen. The user input unit 121 may also perform various input operations.

The audio input unit 122 may receive the user's voice input. The audio input unit 122 may include a microphone switching the voice input into an electric signal. The audio input unit 122 may receive the user's voice to turn on the vehicle assistance device 100. The user input unit 121 may also perform other various input operations.

The input unit 120 may be the input unit 320 illustrated in FIG. 3.

Furthermore, the input unit 120 may denote the vehicle drive unit 350. For example, the input unit 120 may include a lamp drive unit 354 configured to turn on/off the headlamp 155.

The interface unit 130 may receive information, signals or data, or transmit information, signals or data processed or generated in the processor 170 to an outside. To this end, the interface unit 130 may perform data communication with the controller 370, the vehicle display device 400, the sensing unit 360, the vehicle drive unit 350 and the like provided in the vehicle, through wired or wireless communication technologies.

The interface unit 130 may allow for receiving navigation information through data communications with the controller 370, the vehicle display device 400 or a separate navigator.

Here, the navigation information may include information related to a preset destination, path information based on the destination, map information related to driving of the vehicle, or vehicle location information. Meanwhile, the navigation information may include location information related to the vehicle on a road.

On the other hand, the present disclosure may not be necessarily limited to this, and the control device 100 may generate navigation information by itself, and output the navigation information through the output unit 150 (e.g., display unit 151, audio output unit 152). Such an operation may be carried out under the control of the processor 170 of the control device 100.

Meanwhile, the interface unit 130 may allow for receiving sensor information from the controller 370 or the sensing unit 160, 360.

Here, the sensor information may include information related to at least one of an orientation of the vehicle, a location (GPS) of the vehicle, an angel of the vehicle, a driving speed of the vehicle, an acceleration of the vehicle, a tilt of the vehicle, a forward/backward movement of the vehicle, a battery, a fuel, a tire, a vehicle lamp, internal temperature of the vehicle, external temperature of the vehicle, internal humidity of the vehicle, external humidity of the vehicle, and raining.

The sensor information may be acquired from a heading sensor, a yaw sensor, a gyro sensor, a position module, a vehicle forward/backward movement sensor, a wheel sensor, a vehicle velocity sensor, a vehicle tilt detecting sensor, a battery sensor, a fuel sensor, a tire sensor, a steering sensor by a turn of a handle, a vehicle internal temperature sensor, a vehicle external temperature sensor, a vehicle internal humidity sensor, a vehicle external humidity sensor, a rain sensor, a GPS sensor and the like.

Meanwhile, among those sensor information, the vehicle orientation information, the vehicle location information, the vehicle angle information, vehicle velocity information, the vehicle tilt information and the like, all related to the driving of the vehicle, may be referred to as vehicle driving information.

The interface unit 130 may receive passenger information. Here, the passenger information may be information received through an input device. Or, the passenger information may be information acquired through a passenger detecting to sensor (e.g., a camera capturing a passenger's state). Or, the passenger information may be information received from a mobile terminal belonging to the passenger.

The memory 140 may store various data for an overall operation of the control device 100, such as programs for processing or control of the processor 170.

The memory 140 may store data for checking a predetermined object. For example, the memory 140 may store information for checking (or verifying) what the object corresponds to, according to a preset algorithm, when the predetermined object is detected from an image acquired through the camera module 200.

Meanwhile, the memory 140 may be various storage media, such as ROM, RAM, EPROM, a flash drive, a hard drive and the like, in hardware configuration. The memory 140 may be integrally formed with the processor 170.

The output unit 150 may generate a visual, audible or tactile output, and may include at least one of the display unit 151, the audio output unit 152, the haptic module and an optical output module. The display unit 151 may implement a touch screen as being layered or integrated with a touch sensor. The touch screen may function as the user input unit 121 providing a user input interface between the control device 100 and the user and simultaneously providing an output interface between the control device 100 and the user.

The output unit 150 included in the control device 100 may be the output unit 340 illustrated in FIG. 3, or an additional device.

Similarly, the display unit 151 may also be the display device 400 illustrated in FIG. 3, or an additional device.

The headlamp 155 may be provided in front of the vehicle 300. The headlamp 155 may be formed with various light sources. For example, the rear lamp 154 may emit light by a light source including at least one of a bulb, a micro LED, a matrix LED, an OLED, a laser diode, and the like.

Furthermore, the headlamp 155 may be implemented by at least one of a light source, a reflector for reflecting light emitted from the light source, a shield for forming a preset low-beam pattern, a formed body for changing the color of light and a projection lens. The headlamp 155 may output (irradiate, emit) at least one of low-beam and high beam in a forward direction of the vehicle according to a user's request.

The headlamp 155 may turn on/off the headlamp 155 when a user request is received through the lamp drive unit 354 or input unit 120, for example. When the headlamp 155 is on, light (for example, visible light) may be outputted (irradiated, emitted) in a forward direction of the vehicle.

The headlamp 155 and lamp drive unit 354 described in the above may be preferably provided in the vehicle 300. Meanwhile, hereinafter, for the sake of convenience of explanation, it is illustrated that the headlamp 155 and lamp drive unit 354 are included in the control device 100.

The control device 100 according to the present disclosure may include a sensing unit 160. Here, the sensing unit 160 may be the sensing unit 360 illustrated in FIG. 3. The sensing unit 160 may be the sensing unit 360 itself provided in the vehicle, or a separate component.

Even when the sensing unit 160 is the separate component, the structure of the sensing unit 360 provided in the vehicle will be applied equally/similarly.

For the sake of explanation, description will be given under assumption that the sensing unit 160 is included in the control device 100. Also, the same/like description of the sensing unit 360 provided in the vehicle and the use of the sensing unit 360 provided in the vehicle will be applied to description of the sensing unit 160 and the use of the sensing unit 160.

The processor 170 may control an overall operation of each unit within the control device 100. The processor 170 may be electrically connected to each unit, component or apparatus within the control device 100.

The processor 170 may process surrounding images acquired through the camera module 200. The processor 170 may process the vehicle surrounding image into a computer vision-based signal.

The processor 170 may merge a plurality of images received from the around view camera module 200c of FIG. 2C. Here, the plurality of images may be images received from the plurality of cameras 221a, 221b, 221c and 221d of FIG. 2C. The processor 170 may generate an around view image or an omnidirectional image by merging the plurality of images. For example, the around view image may be a top view image.

The processor 170 may detect at least one object based on each of the images acquired from the plurality of cameras 221a, 221b, 221c and 221d of FIG. 2C). Or, the processor 170 may detect at least one object based on the around view image.

Also, the processor 170 may detect at least one object based on the omnidirectional image. The control device 100 may track a movement of the detected object.

During the detection of the object, the processor 170 may perform a lane detection (LD), a vehicle detection (VD), a pedestrian detection (PD), a brightspot detection (BD), a traffic sign recognition (TSR), a road surface detection, a structure detection and the like.

For example, the processor 170 may detect an object based on at least one of intensity, a color, histogram, a feature point, a shape, a space position and a motion.

The processor 170 may verify the detected object. The processor 170 may verify the detected object using an identifying method using a neural network, a support vector machine (SVM) method, an identifying method by Ada-Boost using a Haar-like characteristic, a histograms of oriented gradients (HOG) technology, or the like. In this instance, the processor 170 may perform such verification by comparing the object detected from the surrounding image of the vehicle with data stored in the memory 140.

The processor 170 may track the verified object. The processor 170 may calculate a motion or a motion vector of the verified object and track a movement and the like of the object based on the calculated motion or motion vector.

Meanwhile, the processor 170, for hardware implementation, may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein.

The power unit 190 may supply power required for an operation of each component according to the control of the processor 170. Specifically, the power unit 190 may receive power supplied from an internal battery of the vehicle and the like.

As aforementioned, the control device 100 described in FIG. 4 may be a component or device independently provided in the vehicle 300 or the controller 370 described in FIG. 3.

The control device 100 which can include at least one of those components may control various lamps provided on the vehicle.

Figure 5:
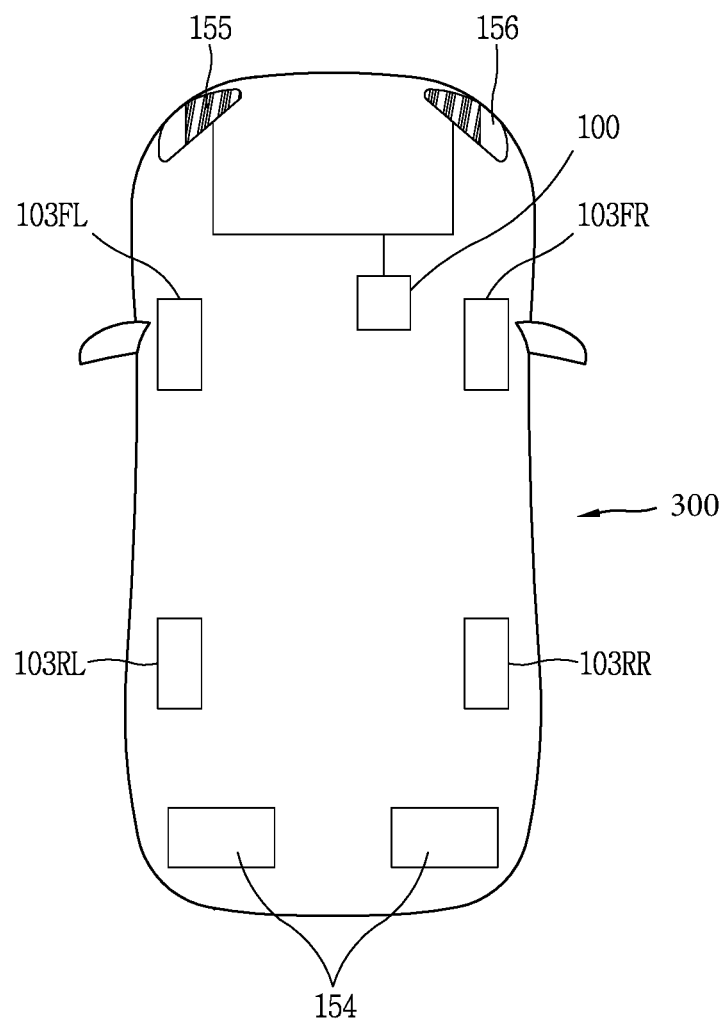
FIG. 5 is a diagram illustrating an example of a headlamp mounted on a vehicle according to an implementation of the present disclosure.

FIG. 5 is a diagram illustrating an example of a headlamp provided on a vehicle according to an implementation of the present disclosure.

Referring to FIG. 5, the vehicle 300 disclosed herein may include lamps 154, 155, 156 that can be controlled by the control device 100 (or the controller 370).

For example, the lamps may include head lamps 155 provided on a front side of the vehicle to irradiate visible light in a forward direction of the vehicle, rear lamps 154 provided on a rear side of the vehicle to emit visible light in a backward direction of the vehicle, and turn indicator lamps 156.

The headlamp 155 may be turn on when a user request is received through the lamp drive unit 354 or input unit 120 as described above. When the headlamp 155 is turned on, light (e.g., visible light) may be irradiated toward in a forward direction of the vehicle 300.

For an example, when a low-beam output request is received by a user request, the headlamp 155 may irradiate low-beam in a forward direction of the vehicle 300. The low-beam may form a preset cut-off line, and the cut-off line may have various shapes according to the design.

Furthermore, the headlamp 155 may irradiate high-beam in a forward direction of the vehicle 300 when a high-beam output is requested by a user request. When a high-beam output is requested, in general, high-beam may be irradiated along with low-beam, a region irradiated with high-beam and a region irradiated with low-beam may overlap with each other on a partial portion thereof.

On the other hand, the low-beam or high-beam may be irradiated in a forward direction of the vehicle by the control of the control device 100. For example, when a light output request is received through the lamp drive unit 354 or input unit 120, the processor 170 of the control device 100 may control the headlamp 155 to allow the headlamp 155 to output light in a forward direction of the vehicle.

Furthermore, the headlamp 155 may be turned on when the ambient brightness is lower than the reference brightness by the sensing unit 160. For example, when the brightness adjacent to the vehicle that is sensed through the sensing unit 160 is lower than a preset brightness, the processor 170 may control the headlamp 155 to irradiate light in a forward direction of the vehicle.

On the other hand, the headlamp 155 may be formed to change a light irradiation direction.

For example, the headlamp 155 may change the direction of irradiating light (light irradiation direction) by the control of the processor 170 of the control device 100.

For example, the processor 170 may control the headlamp 155 to irradiate light irradiated from the headlamp 155 in an upward direction (for example, heightwise direction (H)) based on a preset condition (for example, user manipulation or surrounding environment) in a state that light outputted from the headlamp 155 is irradiated in the lengthwise direction (D).

The foregoing described examples in which the light irradiation direction of the headlamp 155 is changeable in an upward direction, but the present disclosure is not necessarily limited to such implementations, and the headlamp 155 may change the light irradiation direction in any suitable direction.

The light irradiation direction of the headlamp 155 may be changed (varied) by at least one of various constituent elements (for example, a light source, a reflector, a shield, a formed body or a lens) forming the headlamp 155, or changed (varied) through a deformable member formed on a housing of the headlamp 155 or at an outside of the headlamp 155.

Hereinafter, the controlling (changing, varying) of the light irradiation direction of the headlamp 155 by the processor 170 may be carried out at least one of the constituent elements, housing and deformable member of the headlamp as described above.

The technology of varying the light irradiation direction of the headlamp may correspond to a general technology, and thus the detailed description thereof will be omitted.

On the other hand, the headlamp 155 associated with the present disclosure may include a plurality of light sources. In the headlamp 155, the plurality of light sources may be provided in a matrix form or the plurality of light sources may be provided in a micro form. Furthermore, the plurality of light sources may be formed in a matrix form in the size of micro units.

The plurality of light sources may be respectively a halogen lamp, a light emitting diode (LED) or a laser diode (LD).

The plurality of light sources may be individually controlled. The processor 170 may individually (or independently) control the plurality of light sources.

Here, individually controlling the plurality of light sources may include the meaning of individually turning on/off the plurality of light sources, individually adjusting the irradiation brightness (or amount of output light) or individually varying the light irradiation direction.

For example, the processor 170 may allow part of the plurality of light sources to be irradiated in a first irradiation direction and the rest of the plurality of light sources to be irradiated in a second irradiation direction different from the first irradiation direction.

For another example, the processor 170 may allow part of the plurality of light sources to be irradiated toward a front side of the vehicle, and the rest of the plurality of light sources to be irradiated on a sign sensed by the sensing unit 160. When the sensed sign is located in a side front direction or upper front direction of the vehicle, the headlamp 155 of the vehicle may irradiate light in two directions.

In some implementations, a control device may be provided in a vehicle that is configured to provide information associated with route information to a driver under driving in an optimization method when the vehicle is traveling in a state that the route information is set, and a control method thereof.

The implementations of a control method of a headlamp described below may, in some scenarios, enhance convenience and intuitiveness for a user who is driving a vehicle.

Figure 6:
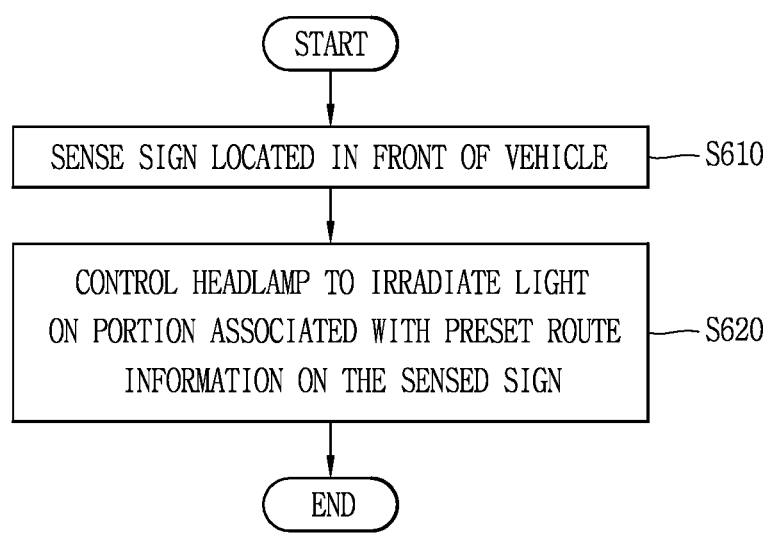
FIG. 6 is a flow chart illustrating an example of controlling a headlamp of a vehicle according to some implementations of the present disclosure.

FIG. 6 is a flow chart for explaining a representative control method of the present disclosure, and FIGS. 7A to 7F are diagrams illustrating various examples of the control method illustrated in FIG. 6.

First, the control device 100 associated with the present disclosure is able to provide route information. Here, providing route information may denote outputting route information through the output unit 150, 340 (for example, display unit 151, 341 or audio output unit 152, 342) or display device 400 to allow a user (driver) to recognize the route information.

The route information may be information indicating a route from the current location of the vehicle 300 (or the control device 100 provided in the vehicle). Furthermore, the route information may be information indicating a route from a departure set by a user to a destination set by the user.

When destination information is entered through the input unit 120, 320, the processor 170 may generate (set) route information based on the destination information and the current location information of the vehicle (or control device).

Then, the processor 170 may display the generated (set) route information on the output unit 150, 740 or display device 400.

The route information may be displayed on an electronic map. For example, the display unit 151, 341, or display device 400 may display an electronic map thereon, and when an additional navigation apparatus configured to provide route information on the displayed electronic map is provided in the vehicle 300, the processor 170 may transmit and receive route information to and from the navigation apparatus through the communication unit 110 (or interface unit 130).

For an example, the processor 170 may transmit set route information to the navigation apparatus through the communication unit 110 (or interface unit 130) to display the set route information on the navigation apparatus.

For another example, when route information is set to the navigation apparatus, the processor 170 may receive the route information from the navigation apparatus through the communication unit 110 (or interface unit 130).

Hereinafter, for the sake of convenience of explanation, it will be described as being outputted to the output unit 150. The meaning of being outputted to the output unit 150 may include the meaning of being outputted to at least one of the output unit 740, display device 400 and navigation apparatus of the vehicle.

At least one place information may be included in (linked to) the route information. For example, the at least one place information may include the current location information of the vehicle (or control device), stopover information, road information, intersection information, direction information in which the vehicle should advance at an intersection, exit road information, entry road information, road information (direction information) at entry and exit roads, destination information, destination surrounding information, alternate route information, traffic information, guide information, point-of-interest (POI) information, and the like to arrive a destination from a current location of the vehicle (or control device).

When a current location is changed as the vehicle travels, the processor 170 may output guide information for guiding at least one place information linked to route information based on the changed current location.

Hereinafter, for the sake of convenience of explanation, it will be described as an example in which route information is in a preset state.

On the other hand, referring to FIG. 6, according to the present disclosure, the process of sensing a sign located in front of the vehicle 300 is carried out (S610). Specifically, the processor 170 may sense a sign located in the vicinity of the vehicle through the sensing unit 160.

The sensing unit 160 may sense a sign location in front (in the vicinity) of the vehicle 300. Here, sensing a sign located in front of the vehicle 300 may include the meaning of sensing a sign locate in the lengthwise direction (L) based on a part (for example, driver's seat) of the vehicle.

Here, the sensing unit 160 may also sense a sign included in a forward direction of the vehicle, an upper front direction of the vehicle, a lower front direction of the vehicle, and a side front direction of the vehicle. For example, the forward direction of the vehicle in the present specification may be understood to have a concept including all of the surrounding of the vehicle, the upper front direction of the vehicle, the lower front direction of the vehicle, and the side front direction of the vehicle.

Furthermore, a sign located in the vicinity of the vehicle may denote a sign located within a predetermined distance from the vehicle, for example. The predetermined distance may be determined by the type, performance, characteristic of the sensing unit 160, vehicle surrounding environment or the like used to recognize (sense) the sign.

Hereinafter, allowing the sensing unit 160 to sense a sign located in the forward direction or the vicinity of the vehicle will be described in a mixed manner, and the forward direction of the vehicle or the surrounding of the vehicle may be understood to have the same/similar meaning.

The technology of sensing a sign located in the vicinity of the vehicle may be a traffic sign recognition (TSR) technology, for example.

The control device 100 provided in the vehicle associated with the present disclosure may perform a TSR function to which the TSR technology is applied. For example, the processor 170 may sense a sign locate in the vicinity of the vehicle using the sensing unit 160 (for example, camera 200, laser sensor, radar, LIDAR, ultrasonic sensor, etc.). Furthermore, the processor 170 may extract (determine, sense, detect) information (or content, text, images) included (or written, disclosed) in the sensed sign using the sensing unit 160 (for example, camera 200).

Information included in the sign may be extracted through an image analysis on an image received through the camera, for example. The content associated with the image analysis is a general technology, and thus the detailed description thereof will be omitted.

Returned to FIG. 6, according to the present disclosure, the process of controlling a headlamp to irradiate light on a portion associated with preset route information on the sensed sign is carried out (S620).

The processor 170 may control the headlamp to irradiate light on a portion associated with preset route information on the sensed sign.

The processor 170 may determine a portion associated with preset route information on the sensed sign based on information included in the preset route information and the sensed sign.

Here, a portion associated with the route information may denote a portion in which information associated with the route information (information corresponding to place information linked to the route information) among information included in a sign on the sensed sign.

When information associated with preset route information is sensed from the sensed sign, the processor 170 may control the headlamp 155 to irradiate light on a portion disclosed with information associated with the route information.

Here, information associated with the route information may denote at least one place information linked to route information, and denote the current location information of the vehicle (or control device), stopover information, road information, intersection information, direction information in which the vehicle should advance at an intersection, exit road information, entry road information, road information (direction information) at entry and exit roads, destination information, destination surrounding information, alternate route information, traffic information, guide information, point-of-interest (POI) information, and the like.

Here, a portion associated with route information may denote a region disclosed with information associated with route information on a sign.

For an example, the processor 170 may control the headlamp 155 to irradiate light outputted from the at least one light source on information associated with route information included in the sign using at least part of a plurality of light sources provided in the headlamp 155.

There may exist a case where a sign is sensed, and information associated with preset route information is included in the sensed sign in a state that the headlamp 155 is irradiating light in a forward direction of the vehicle. In this case, the processor 170 may control the headlamp 155 to control part of the light sources (or reflector, projection lens, etc.) included in the headlamp 155 so as to irradiate light on a portion including information associated with the route information (a portion associated with route information) on the sensed sign while maintaining light to be irradiated in the forward direction of the vehicle.

The foregoing description will be more clearly understood below with reference to FIGS. 7A through 7F.

As illustrated in FIG. 7A, route information 710 may be set to the control device 100 associated with the present disclosure. In some implementations, the route information 710 may be set by a user manipulation or received from an external device (for example, an external navigation apparatus, mobile terminal, etc.), although implementations are not limited thereto.

The route information 710 may include at least one place information.

For example, the route information 710 may include or may be associated with current location information 712, stopover information 714, destination information 716, or other suitable information associate with a route of the vehicle 300 (or control device 100).

The route information 710 may be displayed on a display device (for example, display device 400) provided in the vehicle, and may be displayed on an electronic map.

As illustrated in FIG. 7B, in a state that the route information 710 is set, the processor 170 may sense a sign 720 located in front of the vehicle 300 through the sensing unit 160. The sign 720 may be a physical road sign, as shown in the example of FIG. 7B.

For example, the processor 170 may sense the sign 720 existing within a predetermined distance from the vehicle while the vehicle is being driven.

The processor 170 may extract at least one information that is displayed in the sign 720. For example, the processor 170 may control an image processing operation to process one or more images of the sign 720 captured by the sensing unit 160 or other imaging device. Based on the image processing, the processor 170 may extract the at least one information displayed on the sign 720.

Then, the processor 170 may determine (e.g., sense, recognize, extract) a portion of the route information of the vehicle that is associated with the at least one information from the sensed sign 720. For example, the processor 170 may correlate preset route information for the vehicle with the at least one information extracted from the sign 720, and determine a portion of the preset route information that corresponds to the information displayed on the sign 720.

The portion of the vehicle route information that the processor 170 associates with the sign 720 may be any suitable type of route information. For example, the processor 170 may determine a place or location information linked to preset route information based on the at least one information extracted from the sign 720.

As a specific example, as illustrated in FIG. 7B, a plurality of different information (for example, "Daejeon", "Seoul") may be displayed in the sign 720. Here, any one information 714 of the plurality of information may be information that is associated with the route information 710 set to the control device 100.

Based on determining the portion of the vehicle route information that corresponds to the extracted information displayed in sign 720, the processor 170 may control the headlamp 155 to irradiate light 730 on a portion of the sign 720 that corresponds to the portion of the vehicle route information. For example, as illustrated in FIG. 7C, if the processor 170 determines that "Daejeon" is a place information associated with the vehicle's route information, then the processor 170 may control the headlamp 155 to irradiate light 730 in a preset manner to illuminate particular information on the sign 720, for example by illuminating the portion of the sign 714 that displays the word "Daejeon." As such, headlamp 155 may be controlled to selectively illuminate a portion of the physical sign 720 that is relevant to the vehicle's route information, for example, by illumination the portion of sign 720 that displays "Daejeon" from among the plurality of information that displays "Daejeon" and "Busan" included in sign 720.

Here, the illumination manner may include various techniques in which light outputted from the headlamp 155 is irradiated on a sign. The particular technique that is used may be determined by considering the type of information on which light is irradiated on the sign 720, the amount of light (e.g., brightness, or intensity of light) to be irradiated on the sign 720, the color of light irradiated on the sign 720, the size and shape of a region in which light is irradiated on the sign 720, or the like. As such, the processor 170 may control one or more lamps of the vehicle to selectively irradiate light on a portion of a physical sign (e.g., sign 720) that displays information associated with route information of the vehicle. The information that is selectively illuminated on the sign may be text information corresponding to the route information, along with any other suitable information, such as a shape (for example, an arrow on the sign) or distance information on the sign, for example.

In some implementations, the processor 170 may determine a shape or form of the sensed sign 720. Here, the shape or form of the sign may denote an outer appearance of the sign sensed by the sensing unit 160, such as an edge or boundary shape of the sign.

Based on the overall shape or form of the sign, the processor 170 may control irradiation of light in a preset manner on a selected portion of the sign that is associated with route information of the vehicle. For example, the processor 170 may control the headlamp 155 to irradiate light on a selected portion of the sign corresponding to the vehicle route information based on the form or shape of the sensed sign. As such, based on different forms or shapes of signs, the processor 170 may differentially process and correlate information from that sign with vehicle route information, and thus intelligently illuminate relevant portions of different types of signs.

Figure 7D:
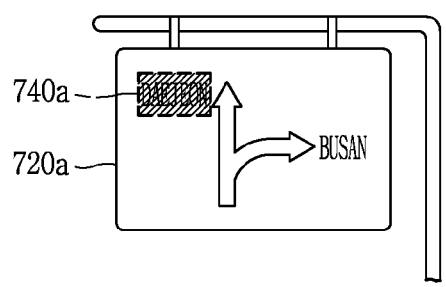

An example of this is illustrated in FIG. 7D, where a sign 720*a* having a first form is sensed. The processor 170 may control irradiation of light 740*a* having an illumination shape that corresponds to the first form of the sign, and thus better illuminate information associated with route information included in the sign 720*a*. In the example of FIG. 7D, the form of the sign 720*a* is a horizontal rectangle, and in this scenario the processor 170 may control irradiation of light 740*a* to be in a shape of a smaller horizontal rectangle.

Figure 7E:
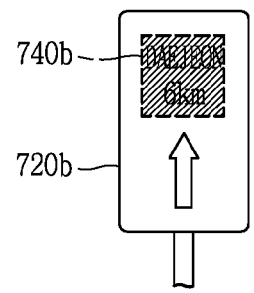

As another example, as illustrated in FIG. 7E, when a sign 720*b* having a second form different from the first form is sensed, the processor 170 may irradiate light 740*b* having a shape corresponding to the second form, based on information associated with route information included in the sign 720*b*.

In some implementations, in addition to controlling the shape of the illumination (e.g., 740*a* and 740*b*), the processor 170 may also control other features of the illumination based on the particular sign or particular information displayed on the sign. For example, the processor 170 may control irradiation of light having different colors, different patterns, and/or different amounts of light (e.g., brightness, intensity) based on the sensed sign and/or based on the particular information to be illuminated in the sign.

Figure 7F:
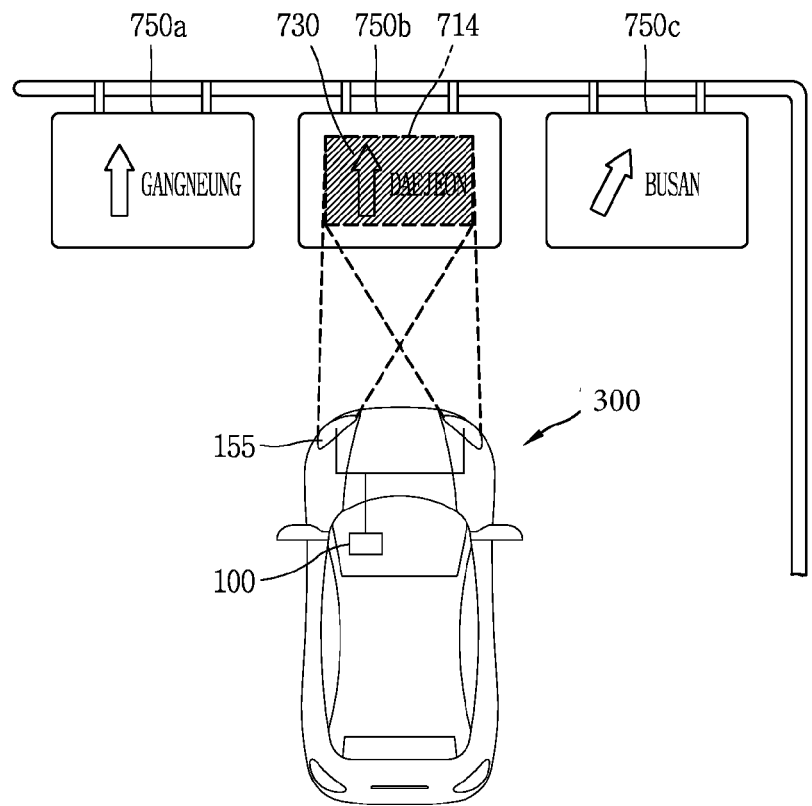

In some scenarios, as illustrated in FIG. 7F, there may be a plurality of signs at different places separated by a predetermined distance from the vehicle 300.

When a plurality of signs displaying different information are sensed, the processor 170 may control the headlamp 155 to irradiate light on a particular sign, among the plurality of signs, that displays information associated with the vehicle route information.

For example, referring to FIG. 7C, the processor 170 may sense a plurality of signs 750*a*, 750*b*, and 750*c*. The plurality of signs may be disposed at different places that are all at a predetermined distance, or within a region of a predetermined distance, away from the vehicle 300.

In this case, different types of information may be displayed in the plurality of signs 750*a*, 750*b*, 750*c*.

The processor 170 may determine (extract, detect) information displayed on each sign through the sensing unit 160 (for example, through the camera 200).

Then, the processor 170 may determine a particular sign that is relevant to the vehicle route information. For example, in FIG. 7F, the processor 170 may sense that the sign 750*b* displays information that is relevant to the vehicle route information (e.g., relevant to place information associated with the vehicle route information) 714. The processor 170 may then control the vehicle's headlamp 155 to irradiate light 730 on the sensed sign 750*b*.

If information relevant to the vehicle's route information are included on multiple signs, then the processor 170 may control the headlamp 155 to irradiate light on all or at least two of the multiple signs that are relevant.

In this scenario, the techniques of irradiating light on at least two signs may be different for each of the signs. For example, when information associated with route information are sensed on at least two signs, the processor 170 may control the headlamp 155 to irradiate light via different illumination techniques, respectively, on each of the at least two signs.

The foregoing implementations may thus irradiate light on one or more signs when information associated with vehicle route information is sensed on the sign(s) while driving a vehicle. As such, implementations may provide a type of user interface configured to allow a user (driver) to more conveniently drive the vehicle. Furthermore, some implementations may irradiate light on a portion associated with route information on a sign based on the route information, thereby providing a control device (e.g., a vehicle assistance device) configured to intuitively notify route information to a user.

Implementations disclosed herein may generally be configured to control a vehicle headlamp in more various ways. Hereinafter, some examples of various implementations will be described in more detail with reference to the accompanying drawings.

FIGS. 8A to 8C, 9A, 9B, 10A, 10B, 11A, 11B, 12, 13, 14A, 14B, 15, 16A, 16B, 17, 18, 19A, and 19B are diagrams illustrating examples of controlling a headlamp according to various implementations of the present disclosure.

First, referring to FIGS. 8A to 8C, when information associated with route information is sensed a plural number of times through the sensing unit 160 of vehicle 300, the processor 170 may control the headlamp 155 to irradiate the light on the information in a different manner whenever it is sensed.

In such implementations, for example, when the vehicle travels on a road (for example, a highway), then different types of information associated with route information may be sensed a plural number of times.

In this case, the processor 170 may control the headlamp 155 to irradiate light in a different manner on a sign when information associated with route information is sensed.

For example, as shown in FIG. 8A, when a first sign 800a displaying information (for example, "Daejeon") associated with route information is sensed, the processor 170 may irradiate light on the first sign 800a with a first illumination 810a.

Then, as shown in FIG. 8B, when a second sign 800b displaying information (for example, "Daejeon") associated with the route information is sensed while driving the vehicle 300, the processor 170 may irradiate light on the second sign 800b with a second illumination 810b different from the first illumination 810a.

Furthermore, as shown in FIG. 8C, when a third sign 800c displaying information (for example, "Daejeon") associated with the route information is sensed while driving the vehicle 300, the processor 170 may irradiate light on the third sign 800c with a third illumination 810c different from the first and the second illuminations 810a and 810b.

Here, irradiating light with different illuminations may include the processor 170 controlling the headlamp 155 to irradiate light with various different features. For example, the different illuminations may have different amounts of light (e.g., brightness, intensity), different colors of light, different forms of a region on which light is irradiated, and/or different patterns of light (for example, blinking frequency, period, etc.), just to name a few examples.

Through the foregoing configuration, the vehicle 300 may irradiate light in a different manner when information associated with route information is sensed a plural number of times, thereby providing a type of user interface configured to notify a route to a user in a more effective and intuitive manner.

In some implementations, when detour route information or recommended route information is received from an external device, in addition to the preset route information, the processor 170 may control the vehicle's headlamp to additionally notify the received route information to a user.

Figure 9A:
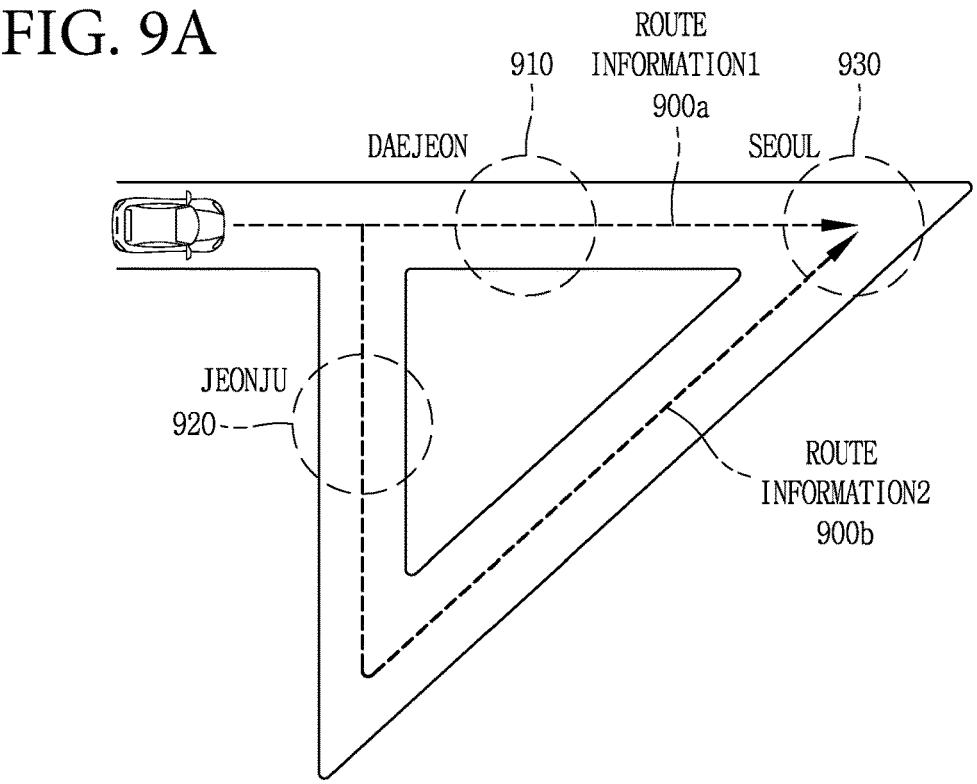
Figure 9B:
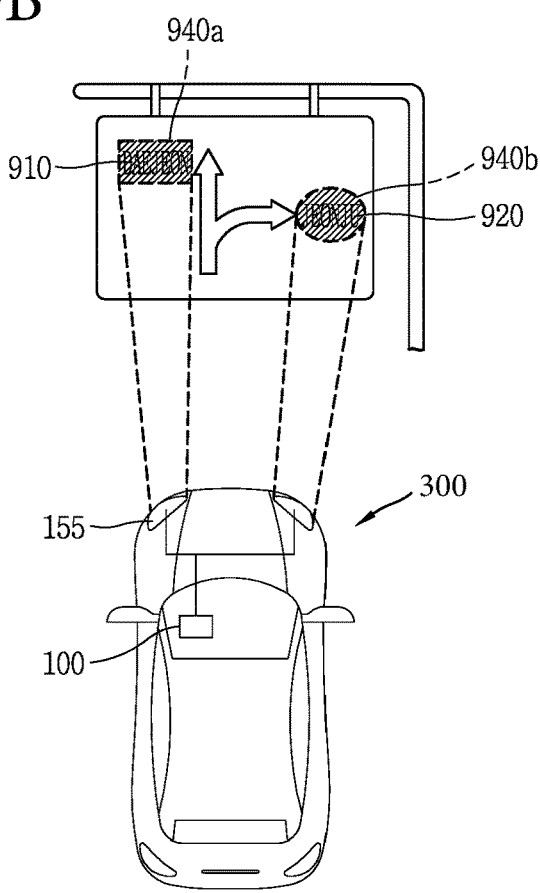

Referring to FIGS. 9A and 9B, the control device 100 of the present disclosure may further include a communication unit 110.

First route information 900a may be set to the control device 100. When the first route information 900a is set, the processor 170 may receive second route information 900b different from the first route information 900a through the communication unit 110.

For example, the second route information 900b may be received from an external device, an external terminal, or the like, that is configured to communicate with the control device 100. The second route information 900b may be associated with the current location of the control device 100, a traffic condition, a road condition, and the like. When the second route information 900b is received through the communication unit 110, the control device 100 may output notification information for notifying a user that the second route information 900b has been received, e.g., by outputting such notification through an output unit (e.g., output unit 150, 740, and/or 400).

For an example, as illustrated in FIG. 9A, the first route information 900a being currently displayed may be information indicating a route for reaching a destination 930 via first place information 910.

Furthermore, as illustrated in FIG. 9A, the second route information 900b received through the communication unit 110 may be information indicating a route for reaching the same destination 930 via second place information 920 different from the first place information 910.

When route information (e.g., second route information 900b) different from preset route information (e.g., first route information 900a) is received through the communication unit 110, the processor 170 may irradiate light in a predetermined manner on a portion of a sign associated with the received different route information (e.g., second route information 900b). The sign may be sensed through the sensing unit 160 of vehicle 300, for example.

Referring to FIG. 9B, when the second route information 900b is received in a state that the first route information 900a is set, the processor 170 may irradiate light on information 910 displayed on a sign associated with the first route information 900a, and also irradiate light on information 920 associated with the second route information 900b in different manners, respectively, on a sign sensed through the sensing unit 160.

For example, when a sign is sensed through the sensing unit 160 as illustrated in FIG. 9B, the processor 170 may irradiate light in a first illumination 940a on information 910 displayed on the sign that is associated with the first route information 900a, among a plurality of information included in the sign. In addition, the processor 170 may irradiate light in a second illumination 940b (different from the first illumination 940a) on information 920 displayed in the sign that is associated with the second route information 900b.

The first and the second illuminations 940a and 940b may be generated by different illumination techniques, and as described above, may be generated by the headlamp 155 irradiating light with different amounts of light (e.g., brightness, intensity), different colors of light, different forms of a region on which light is irradiated, and/or different patterns of light (for example, blinking frequency, period, etc.), just as a few examples.

For example, the processor 170 may irradiate light having a first form on a portion of a sign displaying information 910 associated with the first route information 900a. Furthermore, the processor 170 may irradiate light having a second form, different from the first form, on a portion of the sign displaying information 920 associated with the second route information 900b.

Then, when it is determined that the vehicle 300 travels in accordance with the second route information 900b, the processor 170 may change the preset route information from the first route information 900a to the second route information 900b.

Furthermore, the processor 170 may output notification information for notifying a user of the change to the second route information 900b, for example through an output unit.

In addition, in some implementations, route guidance according to the traveling of the vehicle may be output via the output unit based on the changed second route information 900b.

Through the foregoing configuration, some implementations may provide a type of user interface configured to assist a user to better identify a physical road that corresponds to different types of route information, while allowing the user to maintain eye contact in a forward direction. As such, when updated route information different from preset route information is received through the communication unit, the control device and the vehicle may enhance convenience of driving by allowing a user to easily see the new route information selectively illuminated on physical landmarks (e.g., signs) ahead of the vehicle.

In some implementations, the control device may also take into consideration other vehicles on the road when irradiating light on a sign based on route information. For example, when another vehicle is sensed (e.g., within a reference distance of vehicle 300) through the sensing unit 160, the processor 170 may change an output method of light being irradiated on a sign.

Figure 10A:
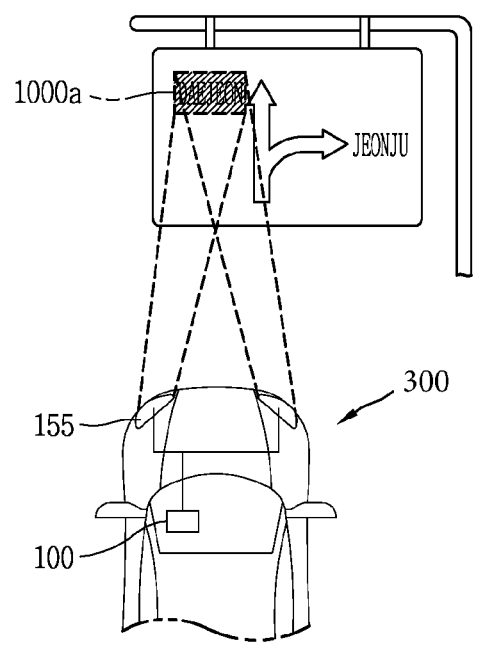
Figure 10B:
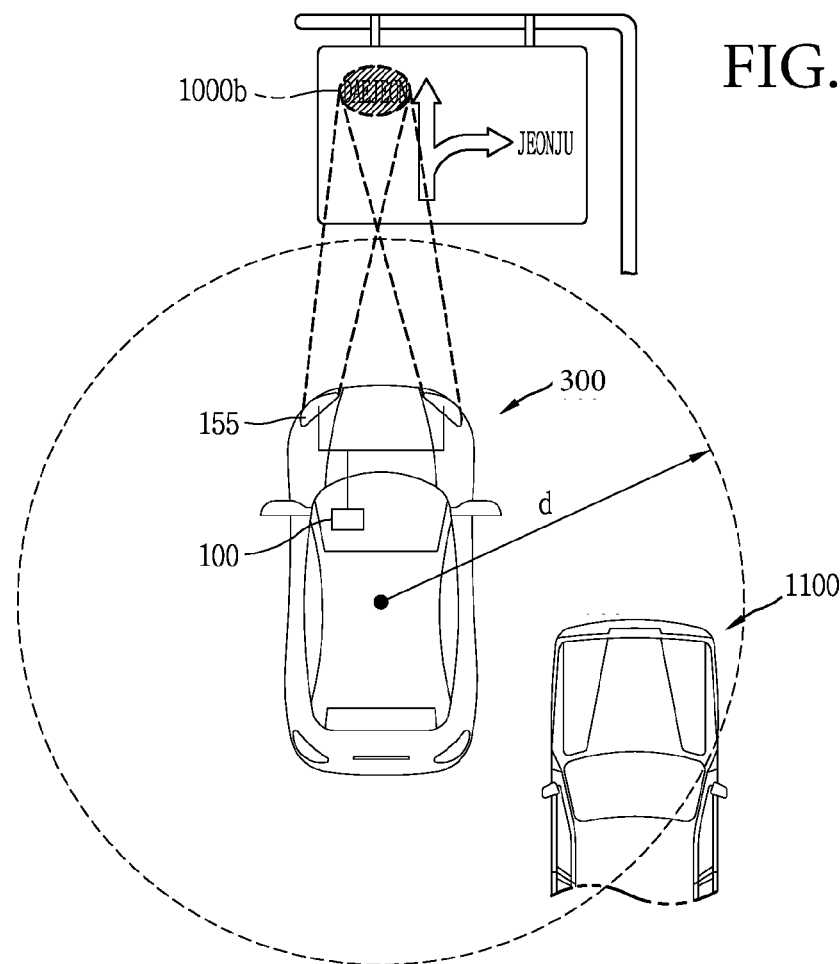

As shown in the examples of FIGS. 10A and 10B, the sensing unit 160 may sense another vehicle 1100 within a reference distance from the vehicle 300. The technology of sensing an object (e.g., another vehicle) existing within a predetermined distance of vehicle 300 may be implemented using various sensors, such as distance sensors or cameras or other sensors that convey information regarding the other vehicle 1100.

As illustrated in FIG. 10A, the processor 170 may irradiate light in a first illumination 1000a on a selected portion of the sign associated with route information. In this state, when another vehicle 1100 is sensed within a reference distance (d) of vehicle 300 through the sensing unit 160, as illustrated in FIG. 10B, the processor 170 may irradiate light on the sign in a second illumination 1000b that is different from the first illumination 1000a.

For example, the processor 170 may irradiate light in a first illumination 1000a on a portion of the sign associated with route information prior to sensing another vehicle 1100 within a reference distance (d) of vehicle 300, and subsequently change and irradiate light from the first illumination 1000a to a second illumination 1000b when the another vehicle 1100 is sensed within the reference distance (d).

The different illuminations 1000a and 1000b may be based on changing any suitable feature of the irradiated light, such as the amount of light (e.g., brightness, intensity) of the headlamp, the color of light, the form of a region on which light is irradiated, and/or the pattern of light (for example, blinking frequency, period, etc.). As such, the vehicle 300 may adapt the selective irradiation of physical signs based on the another vehicle 1100 being sensed within the reference distance (d) through the sensing unit 160.

For example, when another vehicle is sensed within a reference distance, the processor 170 may increase (or decrease) the amount of light irradiated on a sign.

As another example, when another vehicle is sensed within a reference distance, the processor 170 may change the color of light or change the form of a region in which light irradiated on a sign.

As still another example, when another vehicle is sensed within a reference distance, the processor 170 may change the pattern of light from a first pattern to a second pattern (for example, to increase a blinking frequency).

As yet still another example, when another vehicle is sensed within a reference distance, the processor 170 may control the headlamp 155 to reduce the illumination on the sign as compared to when no other vehicles are sensed.

Figure 11A:
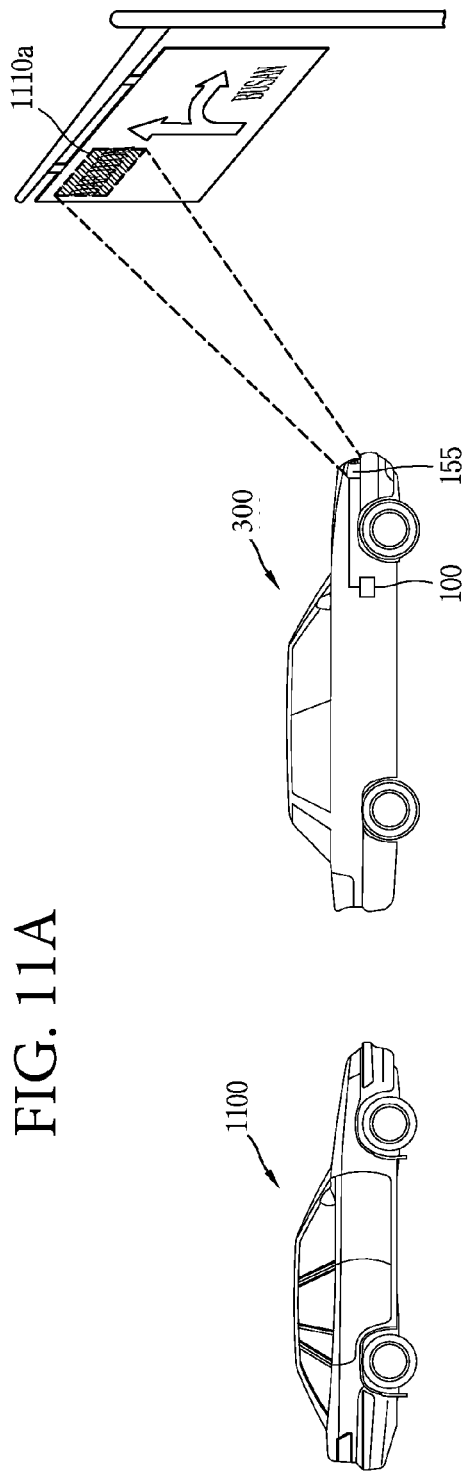
Figure 11B:
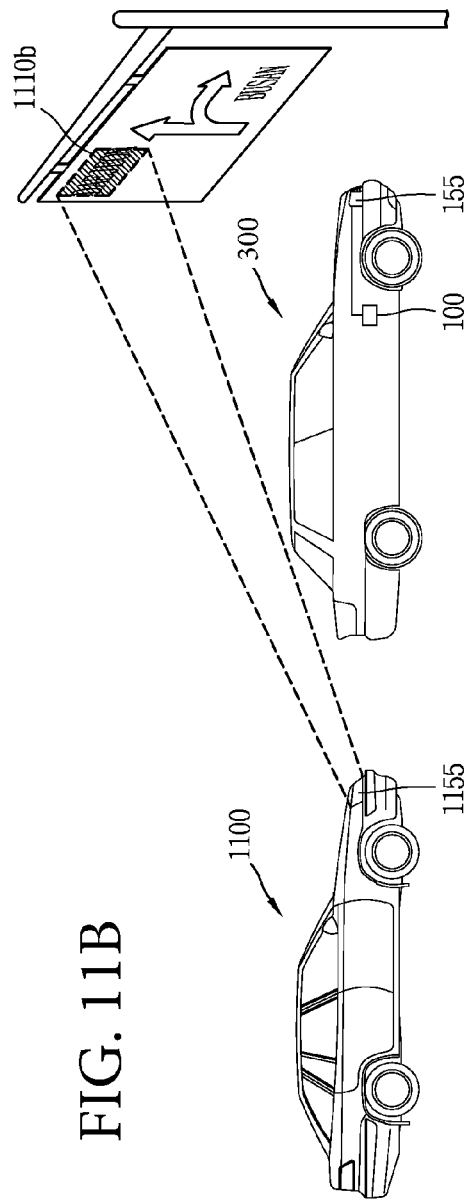

In some implementations, as shown in FIGS. 11A and 11B, when the vehicle 300 senses (e.g., through sensing unit 160) that light is being irradiated on a sign from a trailing vehicle 1100 at a rear side of the vehicle 300, then the processor 170 may control the headlamp 155 to reduce irradiated light on the sign, as compared to a state where no other vehicles are detected.

For example, the processor 170 of vehicle 300 may sense that a trailing vehicle 1100 irradiates light on a sign, in addition to light being irradiated from vehicle 300. The processor 170 may detect such a situation by detecting that the brightness of light being irradiated on the sign is increased, or by detecting that light with a different illumination is additionally irradiating the sign. In such scenarios, the processor 170 may sense (determine) that additional light is being irradiated on the sign from a trailing vehicle.

In this case, some implementations may reduce or stop the selective irradiation of light on the sign from the headlamp of the vehicle 300. This may facilitate the identification of the sign of another vehicle.

For example, as illustrated in FIG. 11A, the processor 170 of vehicle 300 may irradiate light 1110a on a portion of the sign associated with preset route information, the sign having been sensed through sensing unit 160 of vehicle 300.

In this state, as illustrated in FIG. 11B, when the vehicle 300 senses that the headlamp 1155 of the trailing vehicle 1100 located at a rear side of the vehicle 300 irradiates another light 1110b on the sign, the processor 170 may reduce or stop irradiating the light 1110a on the sign.

As such, implementations of the control device may control the headlamp 155 of vehicle 300 to reduce or stop irradiating light on a sign when light is irradiated from another vehicle 1100 in the vicinity of vehicle 300. The another vehicle 1100 may be a trailing vehicle or any other vehicle in the vicinity of vehicle 300 that additionally illuminates the sign.

Through the foregoing configuration, implementations may provide a type of user interface configured to allow a driver to easily identify relevant information on a physical sign using light irradiated from another vehicle, without necessarily performing the selective illumination directly.

Furthermore, the present disclosure may provide a control method of allowing a driver in a trailing vehicle to easily identify a sign when it is sensed that another light is irradiated on the sign from the trailing vehicle in a state that the vehicle irradiates light on the sign, thereby reducing or stopping irradiating light on the sign from the vehicle.

The control device may also perform selective irradiation of light on other physical landmarks, in addition to signs. For example, in some implementations, a control device of a vehicle may selectively irradiate light on a road surface based on route information.

Figure 12:
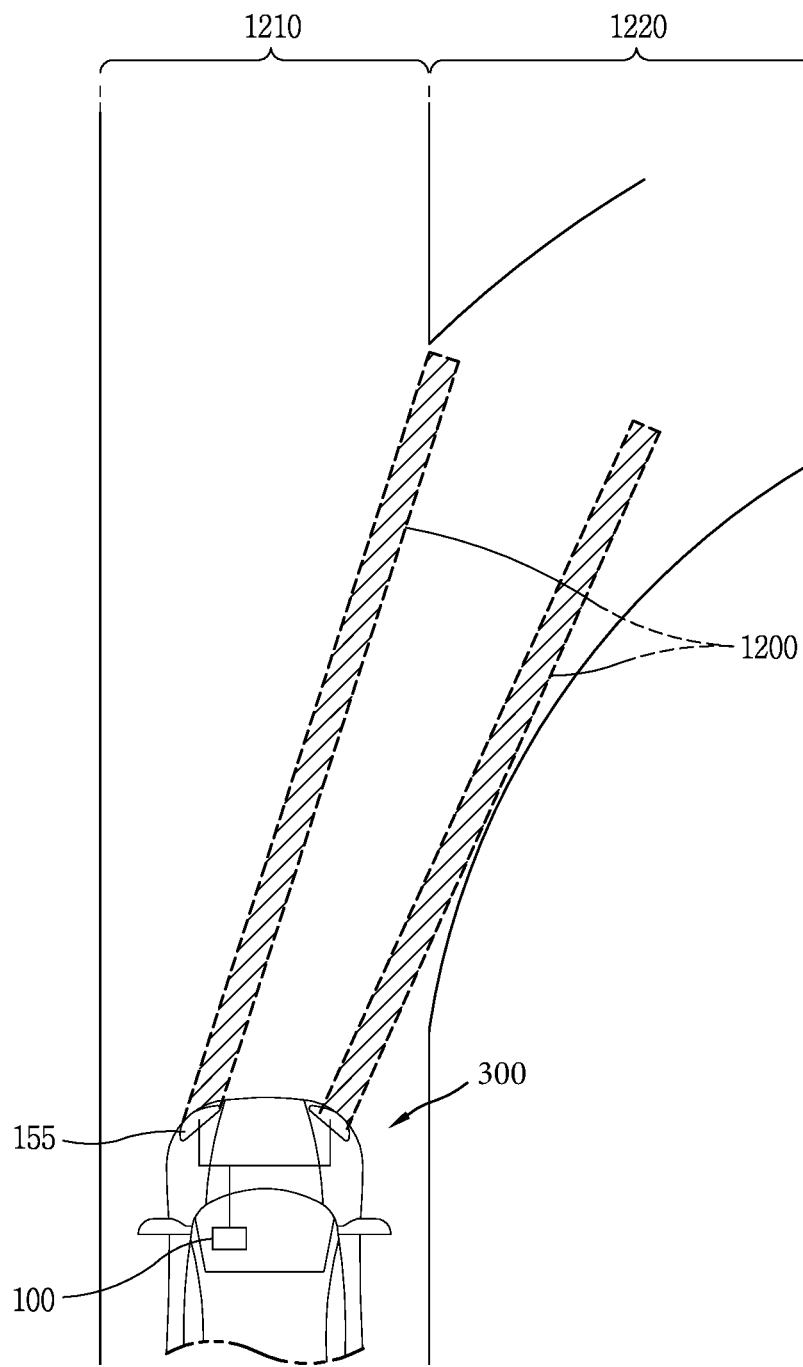

For example, as shown in FIG. 12, when the vehicle 300 approaches a change in the road, the processor 170 may control the headlamp 155 to irradiate a portion of the road (e.g., via illuminating a virtual line) for guiding a change in travelling direction.

Referring to FIG. 12, in a state that the vehicle 300 travels according to route information, there may exist a scenario where the processor 170 should change the traveling road 1210 to another road 1220.

For example, the vehicle 300 may exit from a highway to another road, or enter into a highway from another road, or turn at an intersection in the road.

For example, when the vehicle 300 enters within a predetermined distance from a position at which a first road 1210 on which the vehicle 300 is traveling should be changed to a second road 1220 in a state that the vehicle 300 is traveling along preset route information, the processor 170 may control the headlamp 155 to irradiate a road portion 1200 (e.g., a virtual line) for guiding a change of the road on a road as illustrated in FIG. 12.

Through the foregoing configuration, implementations may provide a type of user interface configured to irradiate light to display an additional guide line on a road. As such, implementations may guide a driver to avoid missing the road change, and facilitate guidance of a road that should be changed.

Figure 13:
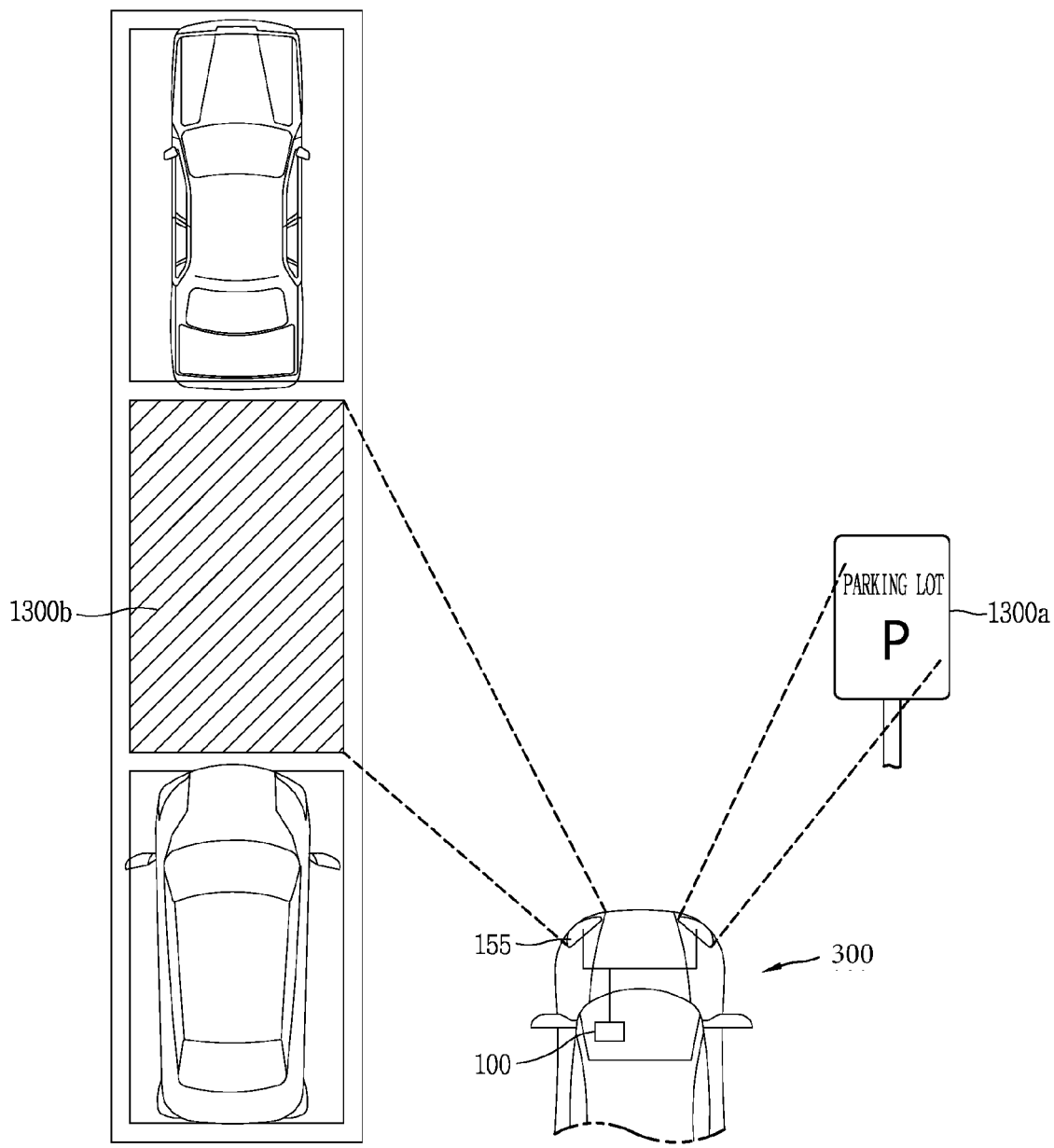

In some implementations, as shown in the example of FIG. 13, the control device may control a headlamp to selectively irradiate light on a particular location when the vehicle enters in the vicinity of a desired destination.

Specifically, when the vehicle 300 enters within a predetermined distance from a destination set in the route information, the processor 170 may control the headlamp 155 to irradiate light on a preset type of sign and/or a space satisfying a preset condition.

The processor 170 may determine whether or not the vehicle 300 enters within a predetermined distance from a destination included in route information based on the current location of vehicle 300 and set route information of vehicle 300 received from the communication unit.

The predetermined distance may be determined according to a user's setting or determined by the control of the processor 170. In some implementations, the predetermined distance may correspond to the vehicle 300 being within a range of a predetermined distance.

When it is sensed that the vehicle 300 enters within a predetermined distance from a destination, as illustrated in FIG. 13, the processor 170 may control the headlamp 155 to irradiate light on a preset type of sign 1300a (for example, a parking guidance sign).

Furthermore, when the vehicle 300 enters within a predetermined distance from a destination, as illustrated in FIG. 13, the processor 170 may irradiate light on a space 1300b (for example, an available parking space) satisfying a preset condition.

Through the foregoing configuration, implementations may provide a vehicle control device that facilitates guiding a driver to a relevant location (e.g., a parking space) for the vehicle in the vicinity of a destination. The vehicle control device may determine the relevant location based on, for example, route information or based on information detected from landmarks (e.g., a parking sign).

In some implementations, as shown in FIGS. 14A and 14B, when a plurality of different signs are disposed at positions separated from each other, the control device associated with the present disclosure may detect information from a second sign, and control a headlamp to display that information on a first sign different from the second sign.

Referring to FIGS. 14A and 14B, when a first sign 1400a is sensed, and a second sign 1400b separated from the first sign 1400a (e.g., by a reference distance d1 in the lengthwise direction L) is sensed through the sensing unit 160, the processor 170 may detect second information from the second sign 1400b, and control the headlamp 155 to irradiate that information as illumination 1410b on the first sign 1400a.

For example, as illustrated in FIG. 14A, information associated with destination information (e.g., Daejeon 150m") may be displayed in the first sign 1400a. In addition, a second sign 1400b may be located within a reference distance (d1) in the lengthwise direction (L) of the vehicle 300 from the first sign 1400a. In such scenarios, a driver of the vehicle 300 may be unable to recognize the second sign 1400b.

Here, the reference distance d1 may be determined by the user's setting or the control of the processor, or based on other suitable information that is stored or to entered.

Here, the reference distance d1 may vary according to the surrounding environment, the weather, and/or the traveling speed of the vehicle 300.

As such, when a first sign 1400a and a second sign 1400b are located within a reference distance, some implementations of the present disclosure may detect information from the second sign 1400b and display that information by illuminating the information on the first sign 1400a. This may allow a user to more easily recognize that information.

For example, as illustrated in FIG. 14B, when the second sign 1400b is located within a reference distance (d1) from the first sign 1400a, the processor 170 may detect (sense, extract) information displayed in the second sign 1400b using the sensing unit 160. The processor 170 may detect such information, for example, by using image processing techniques based on images acquired by the sensing unit 160, or by other suitable information extraction techniques.

Then, the processor 170 may irradiate light on the first sign 1400a such that the irradiated light displays the information that was extracted from the second sign 1400b.

In some implementations, the processor 170 may determine whether or not to irradiate information included in the second sign on the first sign based on at least one of information included in the first sign or information included in the second sign.

For example, when information included in the second sign is irrelevant to route information or does not satisfy a condition (e.g., a condition set by a user), the processor 170 may selectively not irradiate information included in the second sign on the first sign, even when the second sign is located within a reference distance of the first sign.

Through the foregoing configuration, some implementations may provide a type of user interface configured to allow a driver to easily recognize information of a sign located farther away, when a plurality of signs are located close to each other.

Figure 15:
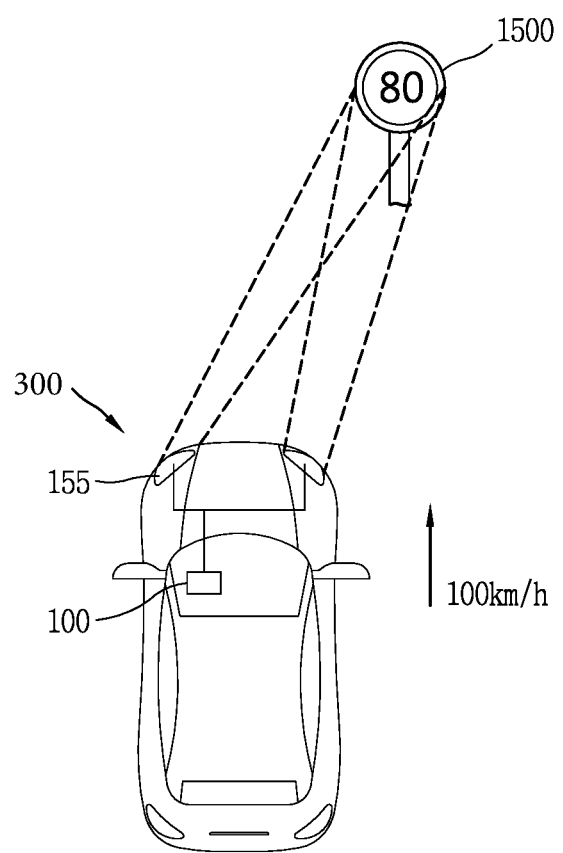

In some implementations, as shown in FIG. 15, a control device may control a headlamp in various ways based on at least one of a traveling road or a traveling status of the vehicle, regardless of route information.

As illustrated in FIG. 15, there may be a speed limit on a road on which the vehicle is traveling. The processor 170 may determine the speed limit of the relevant road based on the current location of the vehicle and a road on which the vehicle is traveling.

A sign indicating the speed limit may be installed on a road. The processor 170 may sense the sign, and determine the speed limit of a road on which the vehicle is traveling based on information included in the sensed sign.

For example, the processor 170 may sense a sign 1500 indicating the speed limit of a traveling road through the sensing unit 160, and irradiate light in a preset manner on the sign 1500 indicating the speed limit when the speed (traveling speed) of the vehicle 300 exceeds the speed limit.

Here, the preset method of irradiating light may be a preset method of outputting light according to the extent to which the traveling speed of the vehicle 300 exceeds the speed limit.

For example, as the traveling speed of the vehicle 300 further exceeds the speed limit, the processor 170 may further adjust the illumination of the sign 1500, for example by further increasing the amount of light (or increase the brightness) irradiated on the sign 1500, or by irradiating light with a preset color on the sign, or by increasing the blinking frequency of the light.

Furthermore, different light output techniques may be associated with different exceeding speeds over the speed limit, and the processor 170 may output light in the appropriate light output technique based on the extent to which the traveling speed exceeds the speed limit.

Through the foregoing configuration, when the vehicle travels over the speed limit, some implementations may provide more effective notification to a user.

Figure 16A:
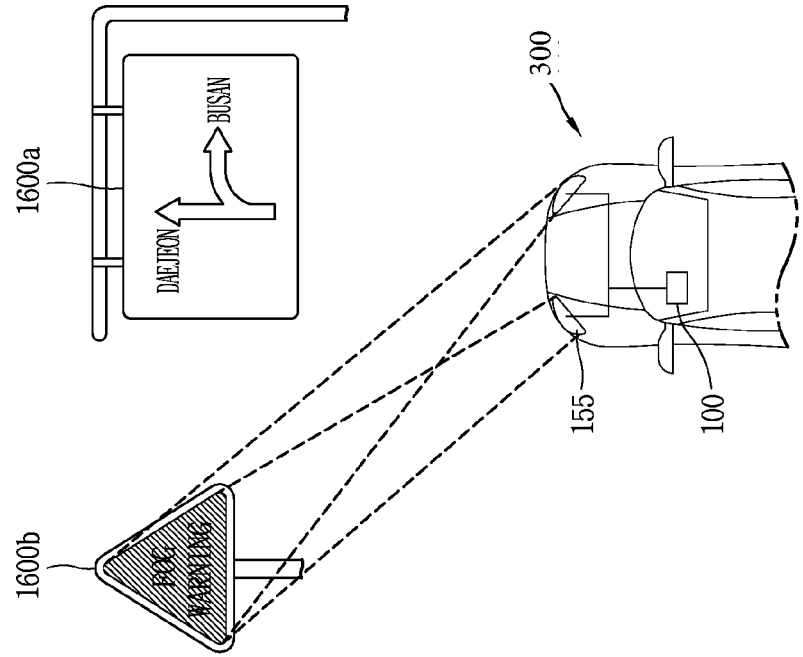
Figure 16B:
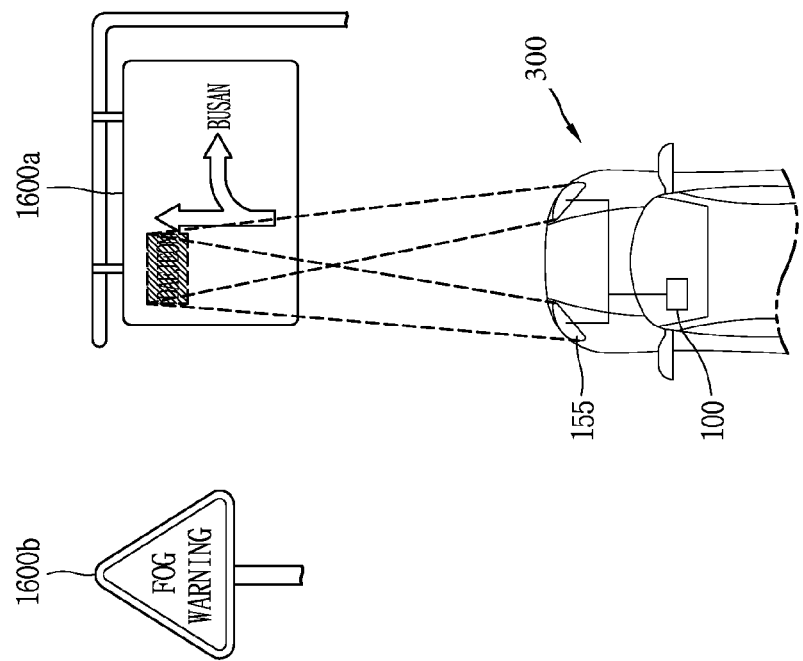

In some implementations, as shown in FIGS. 16A and 16B, the vehicle 300 and control device 100 of the present disclosure may be configured to selectively irradiate light based on an autonomous driving state of the vehicle 300. Here, autonomous driving may denote driving of a vehicle via one or more autonomous operations that are performed without a drivers manipulation. Autonomous driving may be carried out, for example, in an autonomous driving mode of the vehicle 300. Alternatively, manual driving may denote driving a vehicle based on a driver's manipulation, without autonomous operations. Manual driving may be carried out in a manual driving mode.

The control device in some implementations may irradiate light on a different type of sign according to whether the vehicle 300 is in an autonomous driving mode or manual driving mode.

Specifically, the processor 170 may control one or more lamps of the vehicle 300 to irradiate light on a different type of sign based on whether the vehicle 300 is in an autonomous driving mode or manual driving mode.

For example, as illustrated in FIG. 16A, when the vehicle 300 is manually traveling (or in a manual driving mode), the processor 170 may irradiate light on a first type of sign 1600a (for example, a sign including information associated with route information) among signs sensed through the sensing unit 160.

As another example, as illustrated in FIG. 16B, when the vehicle 300 is autonomously traveling (or in an autonomous driving mode), the processor 170 may irradiate light on a second type of sign 1600b different from the first type of sign among signs sensed through the sensing unit 160.

The second type of sign 1600b may be, for example, a sign that is associated with switching the vehicle 300 from autonomous mode to manual mode. For example, the sign 1600b may be a "fog warning" sign or other type of sign indicating a region (e.g., a surrounding environment or an element in the environment) in which the vehicle 300 should release autonomous driving and switch to manual driving. For example, the sign 1600b may indicate a surrounding condition in which autonomous driving may be impaired, for example, due to reduced accuracy of automatically sensing information in the environment.

As described above, some implementations of the present disclosure may provide a type of user interface configured to irradiate light on a sign displayed with information required for a user according to the driving mode of the vehicle.

Figure 17:
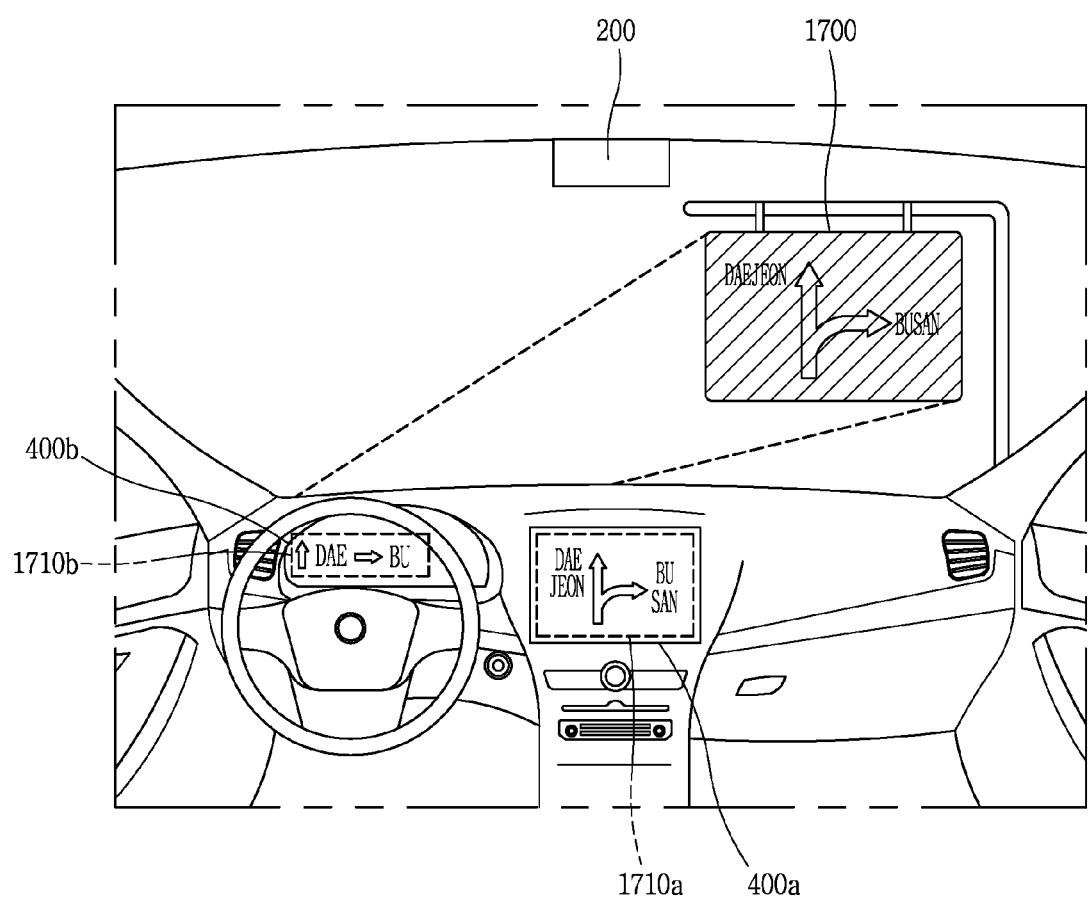

In some implementations, as shown in FIG. 17, a control device may detect a sign including information associated with route information (e.g., through a camera), and display the captured sign (or information from the sign) on a display device provided in the vehicle.

Specifically, the control device 100 may further include a camera 200. The camera 200 may be a camera described in FIGS. 2A through 2C, for example.

The processor 170 may control the camera 200 to capture a sign on which light is irradiated. Based on the captured sign, the processor 170 may display an image associated with the captured sign on a display 400a, 400b provided in the vehicle.

The display 400a, 400b on which the sign information is displayed may include, for example, a navigation apparatus, a CID, a cluster, a head-up display (HUD), the display unit 741 described in FIG. 3, the display unit 151, and/or the display device 400 described in FIG. 4.

The processor 170 may control the camera 200 to capture a sign 1300 including information associated with route information among at least one sign sensed through the sensing unit 160.

Light irradiated from the headlamp 155 may be irradiated on a sign including information associated with the route information. For an example, the processor 170 may irradiate light only on a portion (for example, a portion associated with route information) displayed with information associated with route information on the sign, and then irradiate light on the entire sign when a capture operation of the camera 200 should be carried out.

Then, the processor 170 may extract (determine, sense) an image of a sign from the captured image. Then, the processor 170 may display an image associated with the captured sign on a display 400a or 400b provided in the vehicle 300.

In some implementations, the processor 170 may display an image associated with the sign only for a predetermined period of time or until there is a user input.

An image associated with a sign displayed on the display 400a or 400b may be an image itself captured by the camera, an image or sign image 1710a associated with a sign extracted from the image, or information 1710b generated by processing information included in the sign.

In some implementations, even when the vehicle 300 reduces or stops light irradiation on the sign, for example as the vehicle 300 has passed the sensed sign 1300 or another vehicle irradiates light on the sensed sign, the processor 170 may display an image associated with the captured sign on a display 400a or 400b.

For example, when the vehicle 300 has passed the sensed sign 1300 (or the sign 1300 on which light is being irradiated), the processor 170 may display an image associated with the captured sign on a display of the vehicle 300.

Furthermore, when it is sensed that light outputted from another vehicle is being irradiated on the sensed sign as illustrated in FIG. 11, the processor 170 may display an image associated with the captured sign on a display of the vehicle 300.

Through the foregoing configuration, even when the vehicle 300 has passed a sign including information associated with route information, some implementations may provide a control device configured to continuously view the relevant sign for a predetermined period of time within the vehicle.

Figure 18:
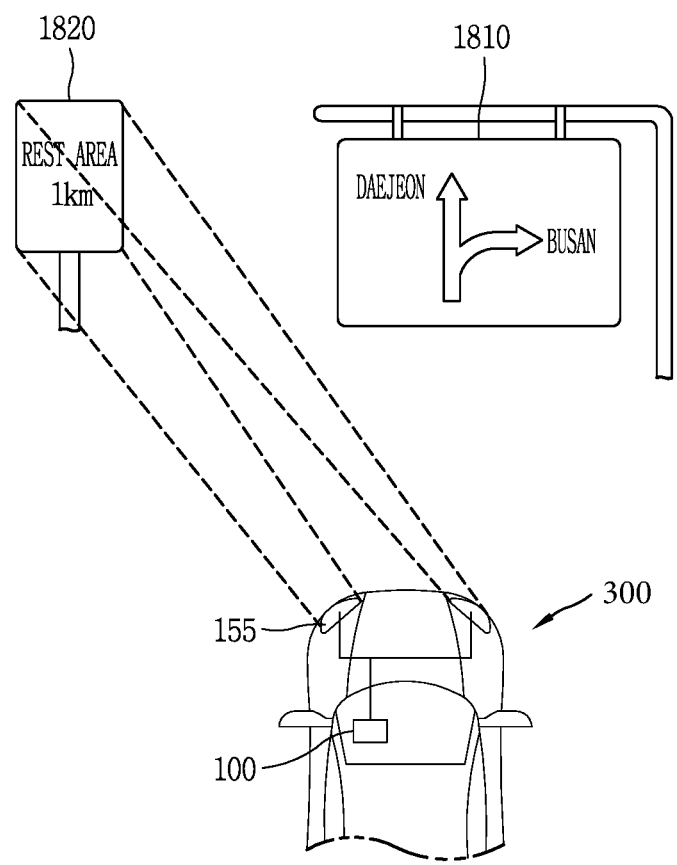

In some implementations, referring to FIG. 18, when route information has not been set for the vehicle 300, the processor 170 may nonetheless control the headlamp 155 to irradiate light on a sign 1820.

Here, the sign may be a sign in which information associated with route information is not included.

Furthermore, when route information is not set, the processor 170 may control the headlamp 155 to irradiate light on a sign including information associated with a traveling road.

In some implementations, the control device 100 may modify (change) route information or generate route information using light irradiated on a sign.

Figure 19A:
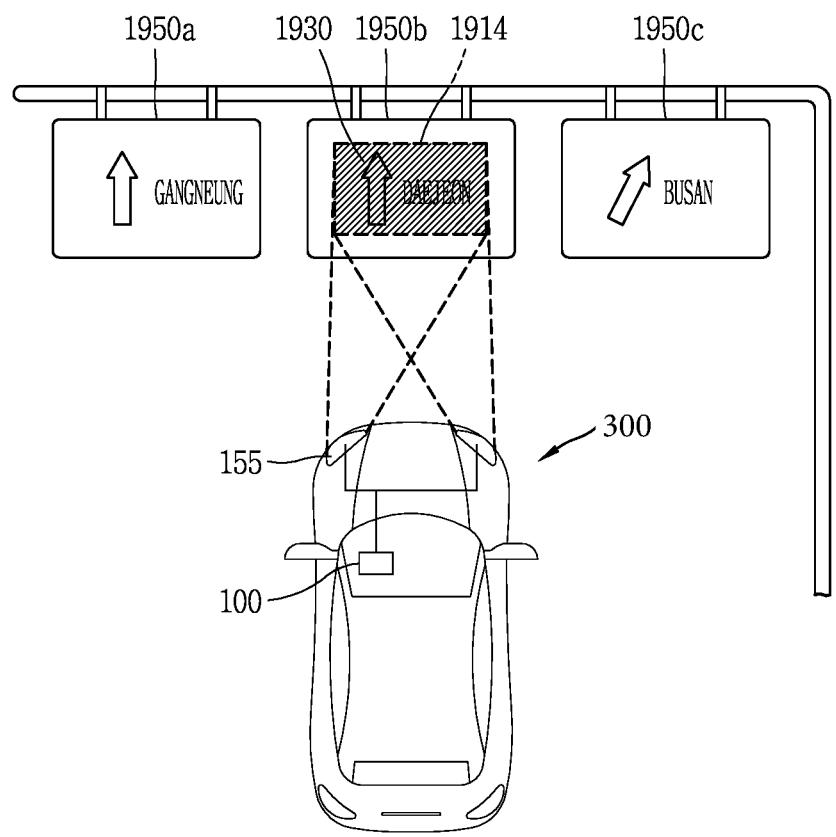
Figure 19B:
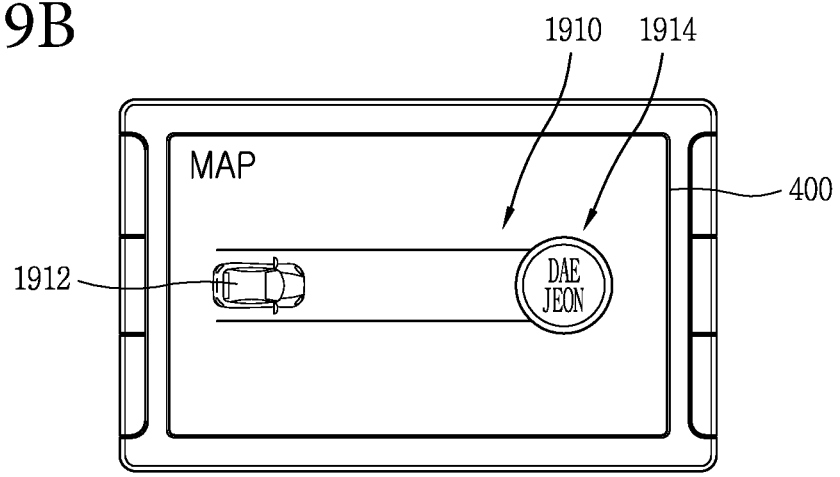

Referring to FIGS. 19A and 19B, the processor 170 may control the headlamp 155 to irradiate light 1930 on at least one of at least one sign 1950a, 1950b, or 1950c sensed through the sensing unit based on a user manipulation.

In this state, when a user input is received, the processor 170 may determine information 1914 written on a sign on which the light is irradiated.

Furthermore, the processor 170 may generate route information 1910 using the current location information 1912 and the destination information 1914 of the vehicle 300 in response to the user input.

Then, as illustrated in FIG. 19B, the processor 170 may display the generated route information 1910 on a display device (for example, display device 400) provided in the vehicle 300.

Here, the user input may include various inputs such as an input received through a user input unit, a user voice, a gesture, and the like.

In some implementations, the control device 100 may change route information in various ways using light irradiated on the sign. For example, when route information is preset, the processor 170 may irradiate light on a portion of a sign associated with the preset route information.

In this state, the processor 170 may change a portion on which light is irradiated on a sign in response to a user input.

For example, when a user input is received in a state that light is irradiated on information associated with route information, the processor 170 may irradiate light on information different from the information.

Information associated with the route information may be, for example, stopover information other than destination information. In this case, when a preset user input is received in a state that the light irradiates the different information, the processor 170 may change preset route information to pass through a place, such as a location indicated by the stopover information, corresponding to the different information.

If a specific input is received in a state that the light irradiates the different place on a sign, then the processor 170 may generate route information having a location corresponding to the different information as a destination, or change the destination of preset route information to a location corresponding to the different information.

Here, the specific input may be an input associated with a function of setting, as a destination, a place that corresponds to information included in a region of a sign on which light is irradiated by lamps of the vehicle 300.

The control device 100 described above may be included in the vehicle 300. Furthermore, the operations or controls described above may be implemented by the control device 100 or may be implemented by other processing components of the vehicle 300.

For example, a control operation of a vehicle (or a control operation of a control device of a vehicle) may include sensing a sign located in front of the vehicle, and controlling a headlamp of the vehicle to irradiate light on a portion of the sensed sign that is associated with route information of the vehicle.

Furthermore, the controlling operation may control the headlamp to irradiate the light in a preset manner to selectively illuminate information displayed on a sign that is associated with route information of the vehicle.

Furthermore, the controlling operation may irradiate the light to selectively illuminate information displayed on a sign that is associated with the route information in a shape corresponding to the type of the sensed sign.

The foregoing operations may be carried out by the controller 370 provided in the vehicle 300 and/or by the control device 100.

Furthermore, the described functions, configurations, and/or control operations carried out by the foregoing control device 100 may be additionally or alternatively carried out by the controller 370 provided in the vehicle 300. For example, the control operations described above may be also applicable to control operations of a vehicle or applicable to control operations of the control device.

The implementations of the present disclosure may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the processor 170 of the control device 100 or the controller 370 of the vehicle. Accordingly, the detailed description thereof should not be construed as restrictive in all aspects but considered as illustrative. The scope of the disclosure should be determined by reasonable interpretation of the appended claims and all changes that come within the equivalent scope of the disclosure are included in the scope of the disclosure.

What is claimed is:

1. A control device comprising:
a headlamp configured to irradiate light in a forward direction of the vehicle; and
at least one processor configured to:
sense, through a sensing unit of the vehicle, at least one sign located in the forward direction of the vehicle; and
based on a first portion of the at least one sign corresponding to first route information of the vehicle, the first portion having a geographical/navigational information on travel or route direction to a desired destination for the vehicle, control the headlamp to irradiate the light on the first portion of the at least one sign that corresponds to the first route information of the vehicle.

2. The control device of claim 1, wherein the at least one processor is configured to control the headlamp to irradiate the light on the first portion of the at least one sign that corresponds to the first route information of the vehicle by:
controlling the headlamp to irradiate the light in a first illumination manner that illuminates, among a plurality of information detected on the at least one sign, first information detected on the at least one sign that corresponds to the first route information of the vehicle.

3. The control device of claim 2, wherein the headlamp comprises a plurality of light sources that are arranged in a matrix form and that are configured to be selectively controlled by the at least one processor, and
wherein the at least one processor is configured to control the headlamp to irradiate the light on the first portion of the at least one sign that corresponds to the first route information of the vehicle by:
based on a type of the at least one sign, selectively controlling the plurality of light sources of the headlamp to irradiate, on the first portion of the at least one sign, the light in a shape that corresponds to the type of the at least one sign.

4. The control device of claim 1, the at least one processor is configured to control the headlamp to irradiate the light on the first portion of the at least one sign that corresponds to the first route information of the vehicle by:
based on the at least one sign comprising a plurality of signs on which different information is detected, controlling the headlamp to irradiate the light on a first sign, among the plurality of signs, on which first information corresponding to the first route information of the vehicle is detected.

5. The control device of claim 1, wherein the at least one processor is configured to control the headlamp to irradiate the light on the first portion of the at least one sign that corresponds to the first route information of the vehicle by:
based on a plurality of information associated with the first route information being sensed a plural number of times on the at least one sign through the sensing unit of the vehicle, controlling the headlamp to irradiate the light in a plurality of illumination manners that illuminate the plurality of information on the at least one sign.

6. The control device of claim 1, further comprising:
a communication unit,
wherein the at least one processor is configured to control the headlamp to irradiate the light on the first portion of the at least one sign that corresponds to the first route information of the vehicle by:
based on second route information different from the first route information being received through the communication unit, irradiating the light in a second illumination manner on a second portion of the at least one sign that corresponds to the received second route information.

7. The control device of claim 1, wherein the at least one processor is further configured to:
based on another vehicle being sensed within a threshold distance of the vehicle through the sensing unit of the vehicle, change an output manner of the light irradiated on the at least one sign.

8. The control device of claim 1, wherein the at least one processor is further configured to:
based on the sensing unit of the vehicle sensing light being irradiated on the at least one sign from a trailing vehicle, control the headlamp to reduce the light that is irradiated on the at least one sign.

9. The control device of claim 1, wherein the at least one processor is further configured to:
based on the vehicle travelling from a first road portion to a second road portion, control the headlamp to irradiate light that indicates, on a surface of a road, an illumination pattern that guides changing from the first road portion to the second road portion.

10. The control device of claim 1, wherein the at least one processor is further configured to:
based on the vehicle being within a threshold distance from a destination indicated in the first route information, control the headlamp of the vehicle to irradiate light on a first type of sign and on a physical space satisfying a first condition.

11. The control device of claim 1, wherein the at least one processor is further configured to:
based on a first sign and a second sign being sensed through the sensing unit of the vehicle, the second sign separated from the first sign in the forward direction of the vehicle by a threshold distance, control the headlamp to irradiate the light by irradiating, on the first sign, an illumination pattern that comprises information detected in the second sign.

12. The control device of claim 1, wherein the at least one processor is further configured to:
based on the sensing unit of the vehicle sensing a first sign that indicates a speed limit, and based on a speed of the vehicle exceeding the speed limit, control the headlamp to irradiate light on the first sign that indicates the speed limit.

13. The control device of claim 1, wherein the at least one processor is configured to control the headlamp to irradiate the light on the first portion of the at least one sign that corresponds to the first route information of the vehicle by:
based on the vehicle being in a manual driving mode, controlling the headlamp to selectively irradiate the light on a first type of sign; and
based on the vehicle being in an autonomous driving mode, controlling the headlamp to selectively irradiate the light on a second type of sign.

14. The control device of claim 1, further comprising:
a camera,
wherein the at least one processor is further configured to:
control the camera to capture an image of a first sign on which the light from the headlamp is irradiated; and
display, on a display unit provided in the vehicle, information associated with the captured image of the first sign on which the light from the headlamp is irradiated.

15. The control device of claim 14, wherein the at least one processor is further configured to:
based on the headlamp ceasing to irradiate the light on the first sign as the vehicle passes the sensed sign or as another vehicle irradiates light on the first sign, display, on the display unit provided in the vehicle, the information associated with the captured image of the first sign.

16. The control device of claim 1, wherein the at least one processor is further configured to:
based on route information not being set for a current driving operation of the vehicle, control the headlamp to irradiate the light on a first sign based on information other than route information.

17. A vehicle comprising the control device according to claim 1.

18. A method of controlling a vehicle that comprises a control device, the method comprising:
sensing at least one sign located in a forward direction of the vehicle; and
based on a first portion of the at least one sign corresponding to first route information of the vehicle, controlling a headlamp of the vehicle to irradiate light on the first portion of the at least one sign that corresponds to the first route information of the vehicle.

19. The method of claim 18, wherein controlling the headlamp of the vehicle to irradiate the light on the first portion of the at least one sign that corresponds to the first route information of the vehicle comprises:
controlling the headlamp to irradiate the light in a first illumination manner that illuminates, among a plurality of information detected on the at least one sign, first information detected on the at least one sign that corresponds to the first route information of the vehicle.

20. The method of claim 18, wherein the headlamp comprises a plurality of light sources that are arranged in a matrix form and that are configured to be selectively controlled, and
wherein controlling the headlamp of the vehicle to irradiate the light on the first portion of the at least one sign that corresponds to the first route information of the vehicle comprises:
based on a type of the at least one sign, selectively controlling the plurality of light sources of the headlamp to irradiate, on the first portion of the at least one sign, the light in a shape that corresponds to the type of the at least one sign.

* * * * *